(12) United States Patent
Gaitonde

(10) Patent No.: US 9,253,154 B2
(45) Date of Patent: Feb. 2, 2016

(54) CONFIGURATION MANAGEMENT FOR A CAPTURE/REGISTRATION SYSTEM

(75) Inventor: Jitendra B. Gaitonde, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 595 days.

(21) Appl. No.: 12/190,536

(22) Filed: Aug. 12, 2008

(65) Prior Publication Data

US 2013/0246377 A1    Sep. 19, 2013

(51) Int. Cl.
*G06F 15/16* (2006.01)
*H04L 29/06* (2006.01)
*H04L 12/24* (2006.01)

(52) U.S. Cl.
CPC ........ *H04L 63/0236* (2013.01); *H04L 41/0813* (2013.01); *H04L 63/0245* (2013.01)

(58) Field of Classification Search
CPC .................. H04L 63/0236; H04L 63/0245
USPC ........................................................ 709/224
See application file for complete search history.

(56) References Cited

U.S. PATENT DOCUMENTS

| | | |
|---|---|---|
| 4,286,255 A | 8/1981 | Siy |
| 4,710,957 A | 12/1987 | Bocci et al. |
| 5,249,289 A | 9/1993 | Thamm et al. |
| 5,465,299 A | 11/1995 | Matsumoto et al. |
| 5,479,654 A | 12/1995 | Squibb |
| 5,497,489 A | 3/1996 | Menne |
| 5,542,090 A | 7/1996 | Henderson et al. |
| 5,557,747 A | 9/1996 | Rogers et al. |
| 5,577,249 A | 11/1996 | Califano |
| 5,623,652 A | 4/1997 | Vora et al. |
| 5,768,578 A | 6/1998 | Kirk |
| 5,781,629 A | 7/1998 | Haber et al. |
| 5,787,232 A | 7/1998 | Greiner et al. |
| 5,794,052 A | 8/1998 | Harding |
| 5,813,009 A | 9/1998 | Johnson et al. |
| 5,873,081 A | 2/1999 | Harel |
| 5,924,096 A | 7/1999 | Draper et al. |
| 5,937,422 A | 8/1999 | Nelson et al. |
| 5,943,670 A | 8/1999 | Prager |
| 5,987,610 A | 11/1999 | Franczek et al. |
| 5,995,111 A | 11/1999 | Morioka et al. |
| 6,026,411 A | 2/2000 | Delp |
| 6,073,142 A | 6/2000 | Geiger et al. |
| 6,078,953 A | 6/2000 | Vaid et al. |

(Continued)

FOREIGN PATENT DOCUMENTS

| | | |
|---|---|---|
| EP | 2499806 | 9/2012 |
| JP | 1994-098770 | 4/1994 |

(Continued)

OTHER PUBLICATIONS

U.S. Appl. No. 12/690,153, filed Jan. 20, 2010, entitled "Query Generation for a Capture System," Inventor(s) Erik de la Iglesia, et al.

(Continued)

*Primary Examiner* — Bryan Lee
(74) *Attorney, Agent, or Firm* — Patent Capital Group

(57) ABSTRACT

A method, apparatus, and system is described for distributing a rule to a distributed capture system and storing the rule in a global configuration database, wherein the rule defines an action for the distributed capture system to perform regarding packets intercepted by the distributed capture system.

34 Claims, 21 Drawing Sheets

(56) References Cited

U.S. PATENT DOCUMENTS

| | | |
|---|---|---|
| 6,094,531 A | 7/2000 | Allison et al. |
| 6,108,697 A | 8/2000 | Raymond et al. |
| 6,122,379 A | 9/2000 | Barbir |
| 6,161,102 A | 12/2000 | Yanagihara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bharat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,584,458 B1 | 6/2003 | Millett et al. |
| 6,598,033 B2 | 7/2003 | Ross et al. |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,976,053 B1 | 12/2005 | Tripp et al. |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,062,705 B1 | 6/2006 | Kirkwood et al. |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,103,607 B1 | 9/2006 | Kirkwood et al. |
| 7,130,587 B2 | 10/2006 | Hikokubo et al. |
| 7,133,400 B1 | 11/2006 | Henderson et al. |
| 7,139,973 B1 | 11/2006 | Kirkwood et al. |
| 7,143,109 B2 | 11/2006 | Nagral et al. |
| 7,158,983 B2 | 1/2007 | Willse et al. |
| 7,165,175 B1 | 1/2007 | Kollmyer et al. |
| 7,181,769 B1 | 2/2007 | Keanini et al. |
| 7,185,073 B1 | 2/2007 | Gai et al. |
| 7,185,192 B1 | 2/2007 | Kahn |
| 7,188,173 B2 | 3/2007 | Anderson et al. |
| 7,194,483 B1 | 3/2007 | Mohan et al. |
| 7,219,131 B2 | 5/2007 | Banister |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,011 B2 | 11/2007 | Chaudhuri et al. |
| 7,296,070 B2 | 11/2007 | Sweeney et al. |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,299,489 B1 | 11/2007 | Branigan et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,539,683 B1 | 5/2009 | Satoh et al. |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,664,083 B1 | 2/2010 | Cermak et al. |
| 7,685,254 B2 | 3/2010 | Pandya |
| 7,730,011 B1 | 6/2010 | Deninger et al. |
| 7,739,080 B1 | 6/2010 | Beck et al. |
| 7,760,730 B2 | 7/2010 | Goldschmidt et al. |
| 7,760,769 B1 | 7/2010 | Lovett et al. |
| 7,774,604 B2 | 8/2010 | Lowe et al. |
| 7,801,852 B2 | 9/2010 | Wong et al. |
| 7,814,327 B2 | 10/2010 | Ahuja et al. |
| 7,818,326 B2 | 10/2010 | Deninger et al. |
| 7,844,582 B1 | 11/2010 | Arbilla et al. |
| 7,849,065 B2 | 12/2010 | Kamani et al. |
| 7,886,359 B2 | 2/2011 | Jones et al. |
| 7,899,828 B2 | 3/2011 | de la Iglesia et al. |
| 7,907,608 B2 | 3/2011 | Liu et al. |
| 7,921,072 B2 | 4/2011 | Bohannon et al. |
| 7,926,099 B1 | 4/2011 | Chakravarty et al. |
| 7,930,540 B2 | 4/2011 | Ahuja et al. |
| 7,949,849 B2 | 5/2011 | Lowe et al. |
| 7,958,227 B2 | 6/2011 | Ahuja et al. |
| 7,962,591 B2 | 6/2011 | Deninger et al. |
| 7,979,524 B2 | 7/2011 | Dieberger et al. |
| 7,984,175 B2 | 7/2011 | de la Iglesia et al. |
| 7,996,373 B1 | 8/2011 | Zoppas et al. |
| 8,005,863 B2 | 8/2011 | de la Iglesia et al. |
| 8,010,689 B2 | 8/2011 | Deninger et al. |
| 8,055,601 B2 | 11/2011 | Pandya |
| 8,056,130 B1 | 11/2011 | Njemanze et al. |
| 8,065,739 B1 | 11/2011 | Bruening et al. |
| 8,166,307 B2 | 4/2012 | Ahuja et al. |
| 8,176,049 B2 | 5/2012 | Deninger et al. |
| 8,200,026 B2 | 6/2012 | Deninger et al. |
| 8,205,242 B2 | 6/2012 | Liu |
| 8,205,244 B2 | 6/2012 | Nightingale et al. |
| 8,261,347 B2 | 9/2012 | Hrabik et al. |
| 8,271,794 B2 | 9/2012 | Lowe et al. |
| 8,286,253 B1 | 10/2012 | Lu et al. |
| 8,301,635 B2 | 10/2012 | de la Iglesia et al. |
| 8,307,007 B2 | 11/2012 | de la Iglesia et al. |
| 8,307,206 B2 | 11/2012 | Ahuja et al. |
| 8,341,734 B1 | 12/2012 | Hernacki et al. |
| 8,463,800 B2 | 6/2013 | Deninger et al. |
| 8,473,442 B1 | 6/2013 | Deninger et al. |
| 8,504,537 B2 | 8/2013 | de la Iglesia et al. |
| 8,521,757 B1 | 8/2013 | Nanda et al. |
| 8,560,534 B2 | 10/2013 | Lowe et al. |

(56) References Cited

U.S. PATENT DOCUMENTS

| | | | |
|---|---|---|---|
| 8,601,537 | B2 | 12/2013 | Lu et al. |
| 8,635,706 | B2 | 1/2014 | Liu |
| 8,656,039 | B2 | 2/2014 | de la Iglesia et al. |
| 8,667,121 | B2 | 3/2014 | Ahuja et al. |
| 8,683,035 | B2 | 3/2014 | Ahuja et al. |
| 8,700,561 | B2 | 4/2014 | Ahuja et al. |
| 8,706,709 | B2 | 4/2014 | Ahuja et al. |
| 8,707,008 | B2 | 4/2014 | Lowe et al. |
| 8,730,955 | B2 | 5/2014 | Liu et al. |
| 8,762,386 | B2 | 6/2014 | de la Iglesia et al. |
| 8,806,615 | B2 | 8/2014 | Ahuja et al. |
| 8,850,591 | B2 | 9/2014 | Ahuja et al. |
| 8,918,359 | B2 | 12/2014 | Ahuja et al. |
| 2001/0013024 | A1 | 8/2001 | Takahashi et al. |
| 2001/0032310 | A1 | 10/2001 | Corella |
| 2001/0037324 | A1 | 11/2001 | Agrawal et al. |
| 2001/0046230 | A1 | 11/2001 | Rojas |
| 2002/0032677 | A1 | 3/2002 | Morgenthaler et al. |
| 2002/0032772 | A1 | 3/2002 | Olstad et al. |
| 2002/0046221 | A1 | 4/2002 | Wallace et al. |
| 2002/0052896 | A1 | 5/2002 | Streit et al. |
| 2002/0065956 | A1 | 5/2002 | Yagawa et al. |
| 2002/0078355 | A1 | 6/2002 | Samar |
| 2002/0091579 | A1 | 7/2002 | Yehia et al. |
| 2002/0103799 | A1 | 8/2002 | Bradford et al. |
| 2002/0103876 | A1 | 8/2002 | Chatani et al. |
| 2002/0107843 | A1 | 8/2002 | Biebesheimer et al. |
| 2002/0116124 | A1 | 8/2002 | Garin et al. |
| 2002/0116721 | A1 | 8/2002 | Dobes et al. |
| 2002/0126673 | A1 | 9/2002 | Dagli et al. |
| 2002/0128903 | A1 | 9/2002 | Kernahan |
| 2002/0129140 | A1 | 9/2002 | Peled et al. |
| 2002/0159447 | A1 | 10/2002 | Carey et al. |
| 2003/0009718 | A1 | 1/2003 | Wolfgang et al. |
| 2003/0028493 | A1 | 2/2003 | Tajima |
| 2003/0028774 | A1 | 2/2003 | Meka |
| 2003/0046369 | A1 | 3/2003 | Sim et al. |
| 2003/0053420 | A1 | 3/2003 | Duckett et al. |
| 2003/0055962 | A1 | 3/2003 | Freund et al. |
| 2003/0065571 | A1 | 4/2003 | Dutta |
| 2003/0084300 | A1 | 5/2003 | Koike |
| 2003/0084318 | A1 | 5/2003 | Schertz |
| 2003/0084326 | A1 | 5/2003 | Tarquini |
| 2003/0093678 | A1 | 5/2003 | Bowe et al. |
| 2003/0099243 | A1 | 5/2003 | Oh et al. |
| 2003/0105716 | A1 | 6/2003 | Sutton et al. |
| 2003/0105739 | A1 | 6/2003 | Essafi et al. |
| 2003/0105854 | A1 | 6/2003 | Thorsteinsson et al. |
| 2003/0131116 | A1 | 7/2003 | Jain et al. |
| 2003/0135612 | A1 | 7/2003 | Huntington |
| 2003/0167392 | A1 | 9/2003 | Fransdonk |
| 2003/0185220 | A1 | 10/2003 | Valenci |
| 2003/0196081 | A1 | 10/2003 | Savarda et al. |
| 2003/0204741 | A1 | 10/2003 | Schoen et al. |
| 2003/0210694 | A1 | 11/2003 | Jayaraman et al. |
| 2003/0221101 | A1 | 11/2003 | Micali |
| 2003/0225796 | A1 | 12/2003 | Matsubara |
| 2003/0225841 | A1 | 12/2003 | Song et al. |
| 2003/0231632 | A1 | 12/2003 | Haeberlen |
| 2003/0233411 | A1 | 12/2003 | Parry et al. |
| 2004/0001498 | A1 | 1/2004 | Chen et al. |
| 2004/0010484 | A1 | 1/2004 | Foulger et al. |
| 2004/0015579 | A1 | 1/2004 | Cooper et al. |
| 2004/0036716 | A1 | 2/2004 | Jordahl |
| 2004/0054779 | A1 | 3/2004 | Takeshima et al. |
| 2004/0059736 | A1 | 3/2004 | Willse et al. |
| 2004/0059920 | A1 | 3/2004 | Godwin |
| 2004/0064537 | A1 | 4/2004 | Anderson et al. |
| 2004/0071164 | A1 | 4/2004 | Baum |
| 2004/0111406 | A1 | 6/2004 | Udeshi et al. |
| 2004/0111678 | A1 | 6/2004 | Hara et al. |
| 2004/0114518 | A1 | 6/2004 | MacFaden et al. |
| 2004/0117414 | A1 | 6/2004 | Braun et al. |
| 2004/0120325 | A1 | 6/2004 | Ayres |
| 2004/0122863 | A1 | 6/2004 | Sidman |
| 2004/0122936 | A1 | 6/2004 | Mizelle et al. |
| 2004/0139120 | A1 | 7/2004 | Clark et al. |
| 2004/0181513 | A1 | 9/2004 | Henderson et al. |
| 2004/0181690 | A1* | 9/2004 | Rothermel et al. ........... 713/201 |
| 2004/0193594 | A1 | 9/2004 | Moore et al. |
| 2004/0194141 | A1 | 9/2004 | Sanders |
| 2004/0196970 | A1 | 10/2004 | Cole |
| 2004/0205457 | A1 | 10/2004 | Bent et al. |
| 2004/0215612 | A1 | 10/2004 | Brody |
| 2004/0220944 | A1 | 11/2004 | Behrens et al. |
| 2004/0225645 | A1 | 11/2004 | Rowney et al. |
| 2004/0230572 | A1 | 11/2004 | Omoigui |
| 2004/0249781 | A1 | 12/2004 | Anderson |
| 2004/0267753 | A1 | 12/2004 | Hoche |
| 2005/0004911 | A1 | 1/2005 | Goldberg et al. |
| 2005/0021715 | A1 | 1/2005 | Dugatkin et al. |
| 2005/0021743 | A1 | 1/2005 | Fleig et al. |
| 2005/0022114 | A1 | 1/2005 | Shanahan et al. |
| 2005/0027881 | A1 | 2/2005 | Figueira et al. |
| 2005/0033726 | A1 | 2/2005 | Wu et al. |
| 2005/0033747 | A1 | 2/2005 | Wittkotter |
| 2005/0033803 | A1 | 2/2005 | Vleet et al. |
| 2005/0038788 | A1 | 2/2005 | Dettinger et al. |
| 2005/0038809 | A1 | 2/2005 | Abajian et al. |
| 2005/0044289 | A1 | 2/2005 | Hendel et al. |
| 2005/0050028 | A1 | 3/2005 | Rose et al. |
| 2005/0050205 | A1 | 3/2005 | Gordy et al. |
| 2005/0055327 | A1 | 3/2005 | Agrawal et al. |
| 2005/0055399 | A1 | 3/2005 | Savchuk |
| 2005/0075103 | A1 | 4/2005 | Hikokubo et al. |
| 2005/0086252 | A1 | 4/2005 | Jones et al. |
| 2005/0091443 | A1 | 4/2005 | Hershkovich et al. |
| 2005/0091532 | A1 | 4/2005 | Moghe |
| 2005/0097441 | A1 | 5/2005 | Herbach et al. |
| 2005/0108244 | A1 | 5/2005 | Riise et al. |
| 2005/0114452 | A1 | 5/2005 | Prakash |
| 2005/0120006 | A1 | 6/2005 | Nye |
| 2005/0127171 | A1 | 6/2005 | Ahuja et al. |
| 2005/0128242 | A1 | 6/2005 | Suzuki |
| 2005/0131876 | A1 | 6/2005 | Ahuja et al. |
| 2005/0132034 | A1 | 6/2005 | de la Iglesia et al. |
| 2005/0132046 | A1 | 6/2005 | de la Iglesia et al. |
| 2005/0132079 | A1 | 6/2005 | de la Iglesia et al. |
| 2005/0132197 | A1 | 6/2005 | Medlar |
| 2005/0132198 | A1 | 6/2005 | Ahuja et al. |
| 2005/0132297 | A1 | 6/2005 | Milic-Frayling et al. |
| 2005/0138110 | A1 | 6/2005 | Redlich et al. |
| 2005/0138242 | A1 | 6/2005 | Pope et al. |
| 2005/0138279 | A1 | 6/2005 | Somasundaram |
| 2005/0149494 | A1 | 7/2005 | Lindh et al. |
| 2005/0149504 | A1 | 7/2005 | Ratnaparkhi |
| 2005/0166066 | A1 | 7/2005 | Ahuja et al. |
| 2005/0177725 | A1 | 8/2005 | Lowe et al. |
| 2005/0180341 | A1 | 8/2005 | Nelson et al. |
| 2005/0182765 | A1 | 8/2005 | Liddy |
| 2005/0188218 | A1 | 8/2005 | Walmsley et al. |
| 2005/0203940 | A1 | 9/2005 | Farrar et al. |
| 2005/0204129 | A1 | 9/2005 | Sudia et al. |
| 2005/0228864 | A1 | 10/2005 | Robertson |
| 2005/0235153 | A1 | 10/2005 | Ikeda |
| 2005/0262044 | A1 | 11/2005 | Chaudhuri et al. |
| 2005/0273614 | A1 | 12/2005 | Ahuja et al. |
| 2005/0289181 | A1 | 12/2005 | Deninger et al. |
| 2006/0005247 | A1 | 1/2006 | Zhang et al. |
| 2006/0021045 | A1 | 1/2006 | Cook |
| 2006/0021050 | A1 | 1/2006 | Cook et al. |
| 2006/0037072 | A1 | 2/2006 | Rao et al. |
| 2006/0041560 | A1 | 2/2006 | Forman et al. |
| 2006/0041570 | A1 | 2/2006 | Lowe et al. |
| 2006/0041760 | A1 | 2/2006 | Huang |
| 2006/0047675 | A1 | 3/2006 | Lowe et al. |
| 2006/0075228 | A1 | 4/2006 | Black et al. |
| 2006/0080130 | A1 | 4/2006 | Choksi |
| 2006/0083180 | A1 | 4/2006 | Baba et al. |
| 2006/0106793 | A1 | 5/2006 | Liang |
| 2006/0106866 | A1 | 5/2006 | Green et al. |
| 2006/0150249 | A1 | 7/2006 | Gassen et al. |
| 2006/0167896 | A1 | 7/2006 | Kapur et al. |
| 2006/0184532 | A1 | 8/2006 | Hamada et al. |

(56) References Cited

U.S. PATENT DOCUMENTS

| | | |
|---|---|---|
| 2006/0235811 A1 | 10/2006 | Fairweather |
| 2006/0242126 A1 | 10/2006 | Fitzhugh |
| 2006/0242313 A1 | 10/2006 | Le et al. |
| 2006/0242694 A1 | 10/2006 | Gold |
| 2006/0251109 A1 | 11/2006 | Muller et al. |
| 2006/0253445 A1 | 11/2006 | Huang et al. |
| 2006/0271506 A1 | 11/2006 | Bohannon et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0011309 A1 | 1/2007 | Brady et al. |
| 2007/0028039 A1 | 2/2007 | Gupta et al. |
| 2007/0036156 A1 | 2/2007 | Liu et al. |
| 2007/0039049 A1 | 2/2007 | Kupferman et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0050846 A1 | 3/2007 | Xie et al. |
| 2007/0081471 A1 | 4/2007 | Talley et al. |
| 2007/0094394 A1 | 4/2007 | Singh et al. |
| 2007/0106660 A1 | 5/2007 | Stern et al. |
| 2007/0106685 A1 | 5/2007 | Houh et al. |
| 2007/0106693 A1 | 5/2007 | Houh et al. |
| 2007/0110089 A1 | 5/2007 | Essafi et al. |
| 2007/0112837 A1 | 5/2007 | Houh et al. |
| 2007/0112838 A1 | 5/2007 | Bjarnestam et al. |
| 2007/0116366 A1 | 5/2007 | Deninger et al. |
| 2007/0124384 A1 | 5/2007 | Howell et al. |
| 2007/0136599 A1 | 6/2007 | Suga |
| 2007/0139723 A1 | 6/2007 | Beadle et al. |
| 2007/0140128 A1 | 6/2007 | Klinker et al. |
| 2007/0143559 A1 | 6/2007 | Yagawa |
| 2007/0162609 A1 | 7/2007 | Pope et al. |
| 2007/0162954 A1 | 7/2007 | Pela |
| 2007/0220607 A1 | 9/2007 | Sprosts et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0260643 A1 | 11/2007 | Borden et al. |
| 2007/0266044 A1 | 11/2007 | Grondin et al. |
| 2007/0271254 A1 | 11/2007 | de la Iglesia et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0027971 A1 | 1/2008 | Statchuk |
| 2008/0028467 A1 | 1/2008 | Kommareddy et al. |
| 2008/0030383 A1 | 2/2008 | Cameron |
| 2008/0082497 A1 | 4/2008 | Leblang et al. |
| 2008/0091408 A1 | 4/2008 | Roulland et al. |
| 2008/0112411 A1 | 5/2008 | Stafford et al. |
| 2008/0115125 A1 | 5/2008 | Stafford et al. |
| 2008/0127346 A1 | 5/2008 | Oh et al. |
| 2008/0140657 A1 | 6/2008 | Azvine et al. |
| 2008/0141117 A1 | 6/2008 | King et al. |
| 2008/0159627 A1 | 7/2008 | Sengamedu |
| 2008/0235163 A1* | 9/2008 | Balasubramanian et al. .. 706/12 |
| 2008/0263019 A1 | 10/2008 | Harrison et al. |
| 2008/0270462 A1 | 10/2008 | Thomsen |
| 2008/0276295 A1 | 11/2008 | Nair |
| 2009/0070327 A1 | 3/2009 | Loeser et al. |
| 2009/0070328 A1 | 3/2009 | Loeser et al. |
| 2009/0070459 A1 | 3/2009 | Cho et al. |
| 2009/0100055 A1 | 4/2009 | Wang |
| 2009/0157659 A1 | 6/2009 | Satoh et al. |
| 2009/0158430 A1 | 6/2009 | Borders |
| 2009/0178110 A1 | 7/2009 | Higuchi |
| 2009/0187568 A1 | 7/2009 | Morin |
| 2009/0193033 A1 | 7/2009 | Ramzan et al. |
| 2009/0216752 A1 | 8/2009 | Terui et al. |
| 2009/0222442 A1 | 9/2009 | Houh et al. |
| 2009/0235150 A1 | 9/2009 | Berry |
| 2009/0254532 A1 | 10/2009 | Yang et al. |
| 2009/0288026 A1 | 11/2009 | Barabas et al. |
| 2009/0288164 A1 | 11/2009 | Adelstein et al. |
| 2009/0300709 A1* | 12/2009 | Chen et al. .................. 726/1 |
| 2009/0326925 A1 | 12/2009 | Crider et al. |
| 2010/0011016 A1 | 1/2010 | Greene |
| 2010/0011410 A1 | 1/2010 | Liu |
| 2010/0023726 A1 | 1/2010 | Aviles |
| 2010/0037324 A1 | 2/2010 | Grant et al. |
| 2010/0088317 A1 | 4/2010 | Bone et al. |
| 2010/0100551 A1 | 4/2010 | Knauft et al. |
| 2010/0121853 A1 | 5/2010 | de la Iglesia et al. |
| 2010/0174528 A1 | 7/2010 | Oya et al. |
| 2010/0185622 A1 | 7/2010 | Deninger et al. |
| 2010/0191732 A1 | 7/2010 | Lowe et al. |
| 2010/0195909 A1 | 8/2010 | Wasson et al. |
| 2010/0268959 A1 | 10/2010 | Lowe et al. |
| 2010/0332502 A1 | 12/2010 | Carmel et al. |
| 2011/0004599 A1 | 1/2011 | Deninger et al. |
| 2011/0040552 A1 | 2/2011 | Van Guilder et al. |
| 2011/0131199 A1 | 6/2011 | Simon et al. |
| 2011/0149959 A1 | 6/2011 | Liu et al. |
| 2011/0167212 A1 | 7/2011 | Lowe et al. |
| 2011/0167265 A1 | 7/2011 | Ahuja et al. |
| 2011/0196911 A1 | 8/2011 | de la Iglesia et al. |
| 2011/0197284 A1 | 8/2011 | Ahuja et al. |
| 2011/0208861 A1 | 8/2011 | Deninger et al. |
| 2011/0219237 A1 | 9/2011 | Ahuja et al. |
| 2011/0258197 A1 | 10/2011 | de la Iglesia et al. |
| 2011/0276575 A1 | 11/2011 | de la Iglesia et al. |
| 2011/0276709 A1 | 11/2011 | Deninger et al. |
| 2012/0114119 A1 | 5/2012 | Ahuja et al. |
| 2012/0179687 A1 | 7/2012 | Liu |
| 2012/0180137 A1 | 7/2012 | Liu |
| 2012/0191722 A1 | 7/2012 | Deninger et al. |
| 2013/0247208 A1 | 9/2013 | Bishop |
| 2014/0164314 A1 | 6/2014 | Ahuja et al. |
| 2014/0164442 A1 | 6/2014 | de la Iglesia |
| 2014/0289416 A1 | 9/2014 | Ahuja et al. |
| 2015/0067810 A1 | 3/2015 | Ahuja et al. |
| 2015/0106875 A1 | 4/2015 | Ahuja et al. |

FOREIGN PATENT DOCUMENTS

| | | |
|---|---|---|
| JP | 2005-209193 | 8/2005 |
| KR | 1020140041391 | 4/2014 |
| WO | 2001-047205 | 6/2001 |
| WO | 2001/099373 | 12/2001 |
| WO | WO 2004/008310 | 1/2004 |
| WO | 2011-080745 | 7/2011 |
| WO | WO 2012/060892 | 5/2012 |

OTHER PUBLICATIONS

Chapter 1. Introduction, "Computer program product for analyzing network traffic," Ethereal. Computer program product for analyzing network traffic, http://web.archive.org/web/20030315045117/www.ethereal.com/distribution/docs/user-guide, pp. 17-26, printed Mar. 12, 2009.

"Computer program product for analyzing network traffic", Ethereal. Computer program product for analyzing network traffic, pp. 17-26 http://web.archive.org/web/20030315045117/www.ethereal.com/distribution/docs/user-guide.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

Preneel, Bart, "Cryptographic Hash Functions", Proceedings of the 3rd Symposium on State and Progress of Research in Cryptography, 1993, pp. 161-171.

(56) References Cited

OTHER PUBLICATIONS

U.S. Appl. No. 12/360,537, filed Jan. 27, 2009, entitled "Database for a Capture System," Inventor(s) Rick Lowe et al.
U.S. Appl. No. 11/254,436, filed Oct. 19, 2005, entitled "Attributes of Captured Objects in a Capture System," Inventor(s) William Deninger et al.
U.S. Appl. No. 12/472,150, filed May 26, 2009, entitled "Identifying Image Type in a Capture System," Inventor(s) William Deninger et al.
U.S. Appl. No. 11/900,964, filed Sep. 14, 2007, entitled "System and Method for Indexing a Capture System," Inventor(s) Ashok Doddapaneni et al.
U.S. Appl. No. 12/171,232, filed Jul. 10, 2008, entitled "System and Method for Data Mining and Security Policy Management," Inventor(s) Weimin Liu et al.
Microsoft Outlook, Out look, copyright 1995-2000, 2 pages.
U.S. Appl. No. 12/873,860, filed Sep. 1, 2010, entitled "A System and Method for Word Indexing in a Capture System and Querying Thereof," Inventor(s) William Deninger, et al.
U.S. Appl. No. 12/873,061, filed Aug. 31, 2010, entitled "Document Registration," Inventor(s) Ratinder Paul Singh Ahuja, et al.
U.S. Appl. No. 12/939,340, filed Nov. 3, 2010, entitled "System and Method for Protecting Specified Data Combinations," Inventor(s) Ratinder Paul Singh Ahuja, et al.
U.S. Appl. No. 12/967,013, filed Dec. 13, 2010, entitled "Tag Data Structure for Maintaining Relational Data Over Captured Objects," Inventor(s) Erik de la Iglesia, et al.
U.S. Appl. No. 13/024,923, filed Feb. 10, 2011, entitled "High Speed Packet Capture," Inventor(s) Weimin Liu, et al.
Mao et al. "MOT: Memory Online Tracing of Web Information System," Proceedings of the Second International Conference on Web Information Systems Engineering (WISE '01); pp. 271-277, (IEEE0-0/7695-1393-X/02) Aug. 7, 2002 (7 pages).
U.S. Appl. No. 13/337,737, filed Dec. 27, 2011, entitled "System and Method for Providing Data Protection Workflows in a Network Environment", Inventor(s) Ratinder Paul Singh Ahuja, et al.
U.S. Appl. No. 13/338,060, filed Dec. 27, 2011, entitled "System and Method for Providing Data Protection Workflows in a Network Environment", Inventor(s) Ratinder Paul Singh Ahuja, et al.
U.S. Appl. No. 13/338,159, filed Dec. 27, 2011, entitled "System and Method for Providing Data Protection Workflows in a Network Environment", Inventor(s) Ratinder Paul Singh Ahuja, et al.
U.S. Appl. No. 13/338,195, filed Dec. 27, 2011, entitled "System and Method for Providing Data Protection Workflows in a Network Environment", Inventor(s) Ratinder Paul Singh Ahuja, et al.
Walter Allasia et al., Indexing and Retrieval of Multimedia Metadata on a Secure DHT, University of Torino, Italy, Department of Computer Science, Aug. 31, 2008, 16 pages.
International Preliminary Report on Patentability Written Opinion of the International Searching Authority for International Application No. PCT/US2011/024902 dated May 7, 2013 (5 pages).
U.S. Appl. No. 13/896,210, filed May 16, 2013, entitled "System and Method for Data Mining and Security Policy Management" Inventor(s) Ratinder Paul Singh Ahuja et al.
U.S. Appl. No. 13/422,791, filed Mar. 16, 2012, entitled "System and Method for Data Mining and Security Policy Management", Inventor, Weimin Liu.
U.S. Appl. No. 13/424,249, filed Mar. 19, 2012, entitled "System and Method for Data Mining and Security Policy Management", Inventor, Weimin Liu.
U.S. Appl. No. 13/431,678, filed Mar. 27, 2012, entitled "Attributes of Captured Objects in a Capture System", Inventors William Deninger, et al.
U.S. Appl. No. 13/436,275, filed Mar. 30, 2012, entitled "System and Method for Intelligent State Management", Inventors William Deninger, et al.
Han, OLAP Mining: An Integration of OLAP with Data Mining, Oct. 1997, pp. 1-18.
International Search Report and Written Opinion and Declaration of Non-Establishment of International Search Report for International Application No. PCT/US2011/024902 mailed Aug. 1, 2011 (8 pages).
Niemi, Constructing OLAP Cubes Based on Queries, Nov. 2001, pp. 1-7.
Schultz, Data Mining for Detection of New Malicious Executables, May 2001, pp. 1-13.
U.S. Appl. No. 13/047,068, filed Mar. 14, 2011, entitled "Cryptographic Policy Enforcement," Inventor(s) Ratinder Paul Singh Ahuja, et al.
U.S. Appl. No. 13/049,533, filed Mar. 16, 2011, entitled "File System for a Capture System," Inventor(s) Rick Lowe, et al.
U.S. Appl. No. 13/089,158, filed Apr. 18, 2011, entitled "Attributes of Captured Objects in a Capture System," Inventor(s) Ratinder Paul Singh Ahuja, et al.
U.S. Appl. No. 13/099,516, filed May 3, 2011, entitled "Object Classification in a Capture System," Inventor(s) William Deninger, et al.
U.S. Appl. No. 13/168,739, filed Jun. 24, 2011, entitled "Method and Apparatus for Data Capture and Analysis System," Inventor(s) Erik de la Iglesia, et al.
U.S. Appl. No. 13/187,421, filed Jul. 20, 2011, entitled "Query Generation for a Capture System," Inventor(s) Erik de la Iglesia, et al.
U.S. Appl. No. 13/188,441, filed Jul. 21, 2011, entitled "Locational Tagging in a Capture System," Inventor(s) William Deninger et al.
Webopedia, definition of "filter", 2002, p. 1.
Werth, T. et al., "Chapter 1—DAG Mining in Procedural Abstraction," Programming Systems Group; Computer Science Department, University of Erlangen-Nuremberg, Germany.
U.S. Appl. No. 14/157,130, filed Jan. 16, 2014, entitled "System and Method for Providing Data Protection Workflows in a Network Environment", Inventor(s) Ratinder Paul Singh Ahuja, et al. (154 pages).
U.S. Appl. No. 14/042,202, filed Sep. 30, 2013, entitled "Document De-Registration", Inventors(s) Ratinder Paul Singh Ahuja, et al., 60 pages.
U.S. Appl. No. 14/181,521, filed Feb. 14, 2014 (22 pages).
U.S. Appl. No. 14/222,477, filed Mar. 21, 2014 (86 pages).
English Translation of the Notice of Preliminary Rejection, KIPO Office Action Mailing Date Apr. 22, 2014 Office Action Summary, 2 pages.
Peter Gordon, "Data Leakage—Threats and Mitigation", IN: SANS Inst. (2007). http://www.sans.org/reading-room/whitepapers/awareness/data-leakage-mitigation-1931?show=data-leakage-threats-mitigation-1931&cat=awareness (69 pages).
U.S. Appl. No. 14/457,038 filed Aug. 11, 2014, 73 pages.
English Translation of the Notice of Allowance, KIPO mailing date Apr. 15, 2015, Notice of Allowance Summary, 1 page.
Compression of Boolean inverted files by document ordering Gelbukh, A.; Sangyong Han; Sidorov, G. Natural Language Processing and Knowledge Engineering, 2003. Proceedings. 2003 International Conference on Year: 2003 pp. 244-249, DOI: 10.1109/NLPKE.2003.1275907.
A Model-Driven Approach for Documenting Business and Requirements Interdependencies for Architectural Decision Making Berrocal, J.; Garcia Alonso, J.; Vicente Chicote, C.; Murillo, J.M. Latin America Transactions, IEEE (Revista IEEE America Latina) Year: 2014, Volume: 12, Issue: 2 pp. 227-235, DOI: 10.1109/TLA.2014.6749542.
Further Result on Distribution Properties of Compressing Sequences Derived From Primitive Sequences Over Oun-Xiong Zheng; Wen-Feng Qi; Tian Tian Information Theory, IEEE Transactions on Year: 2013, Volume: 59, Issue: 8 pages: 5016-5022, DOI: 10.1109/TIT.2013.2258712.
Compressing Inverted Files in Scalable Information Systems by Binary Decision Diagram Encoding Chung-Hung Lai; Tien-Fu Chen Supercomputing, ACM/IEEE 2001 Conference Year: 2001 pp. 36-36, DOI: 10.1109/SC.2001.10019.
English Translation of the Notice of Preliminary Rejection, KIPO Office Action Mailing Date Oct. 8, 2014 Office Action Summary, 3 pages.
English Translation of Abstract for Foreign Reference JP1994-098770, http://www4.ipdl.inpit.go.jp/PA1/result/detail/main/ws7naaDA40609, 1 page.
English Translation of Abstract for Foreign Reference JP2005-209193, http://www.19.ipdl.impit.go.jp/PA1/result/detail/main/waVemiaDA41720, 1 page.

* cited by examiner

| Index 1202 | Status Indicator 1204 | Rule Match Indicator 1206 | Exit Location Indicator 1208 | Forward/Reverse Operator 1210 | Next Table Location Indicator 1212 |

State Table Entry 1200

Figure 12

CONFIGURATION MANAGEMENT FOR A CAPTURE/REGISTRATION SYSTEM

FIELD OF THE INVENTION

Embodiments of the present invention relate generally to computer networks, and in particular, to capturing, analyzing, and registering documents in a computer network.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices.

FIG. 1 illustrates a simple configuration of a local area network (LAN) 100 connected to the Internet 102. Connected to LAN 100 are various components, such as servers 104, clients 106, and switch 108. Numerous other networking components and computing devices may be connected to the LAN 100. The LAN 100 may be implemented using various wireline (e.g., Ethernet) or wireless technologies (e.g., IEEE 802.11x). LAN 100 could also be connected to other LANs.

In this configuration, LAN 100 is connected to the Internet 102 via a router 110. Router 110 may be used to implement a firewall. Data leaving LAN 100 and going to the Internet 102 passes through router 110. Router 110 simply forwards packets as is from LAN 100 to the Internet 102.

BRIEF DESCRIPTION OF THE DRAWINGS

Embodiments of the present invention are illustrated by way of example, and not by way of limitation, in the figures of the accompanying drawings in which like reference numerals refer to similar elements and in which:

FIG. 12 illustrates an example state table entry according to one embodiment of the present invention;

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the art of computer science to most effectively convey the substance of their work to others skilled in the art. An algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers or the like. Keep in mind, however, that all of these and similar terms are to be associated with the appropriate physical quantities and are merely convenient labels applied to these quantities. Unless specifically stated otherwise, it will be appreciated that throughout the description of the present invention, use of terms such as "processing," "computing," "calculating," "determining," "displaying," etc., refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Networks

Figure 1:
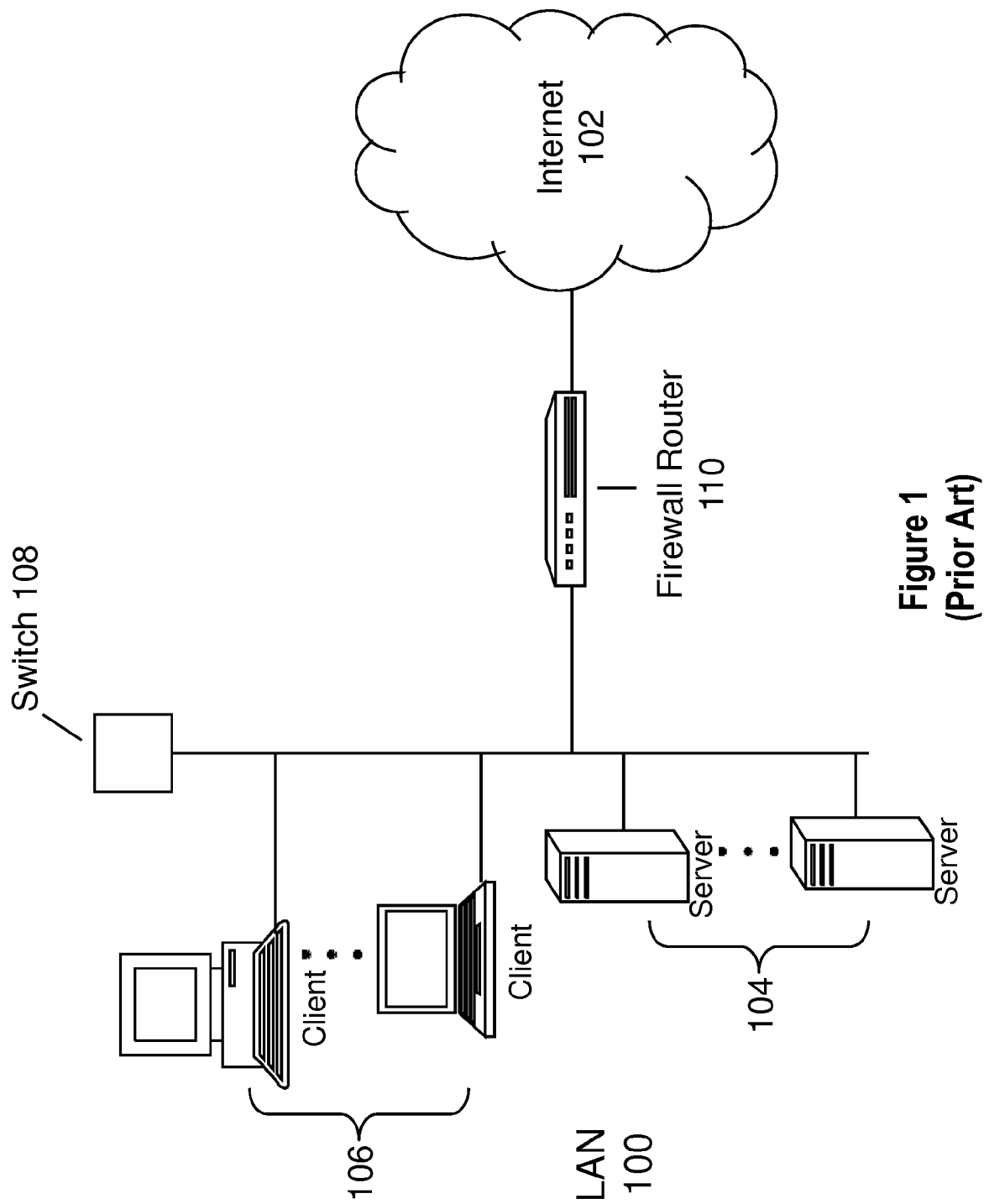
FIG. 1 is a block diagram illustrating a computer network connected to the Internet.

As described earlier with respect to FIG. 1, the router 110 of the prior art simply routes packets to and from a network and the Internet. While the router may log that a transaction has occurred (i.e., packets have been routed), it does not capture, analyze, or store the content contained in the packets.

Figure 2:
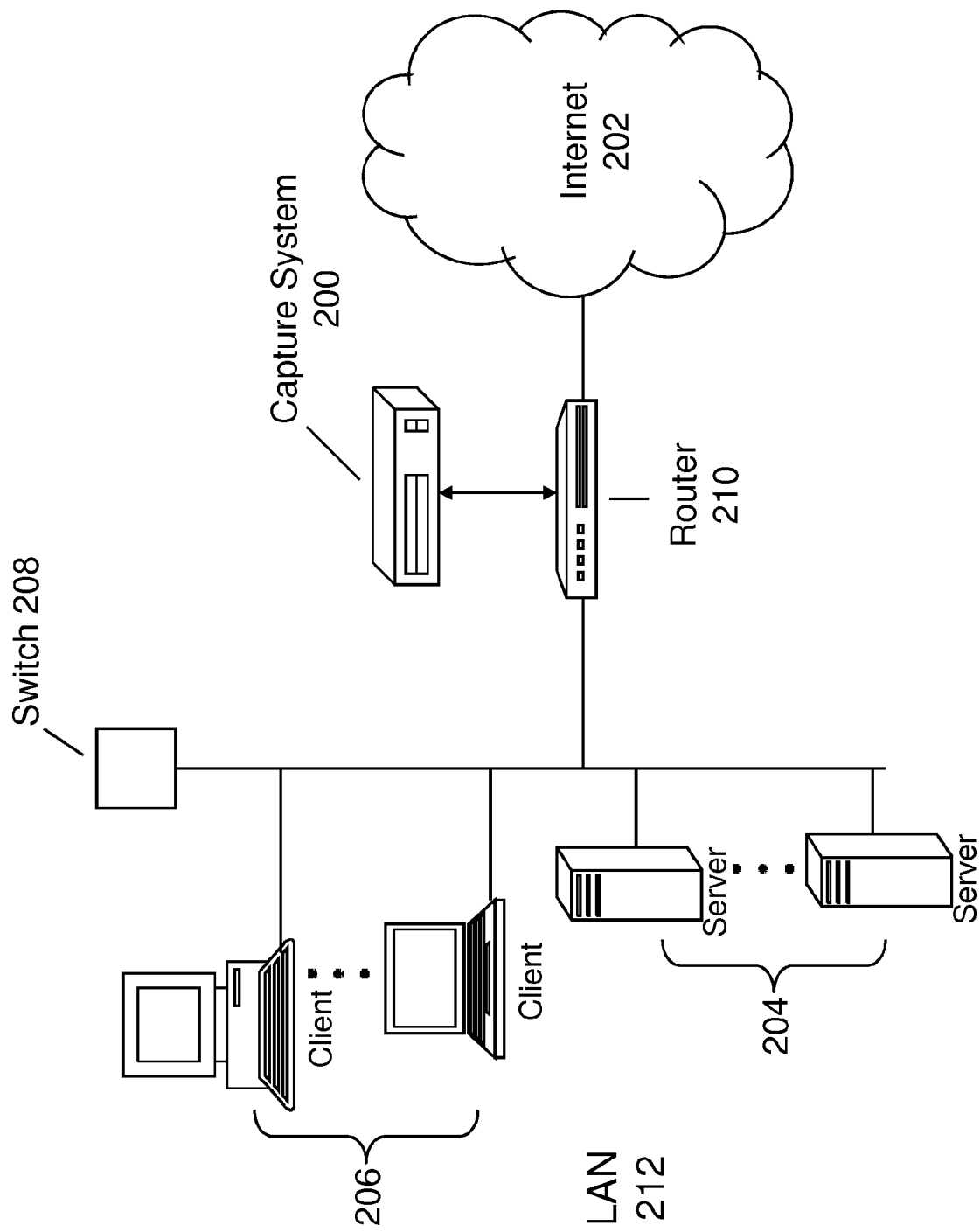
FIG. 2 is a block diagram illustrating one configuration of a capture system according to one embodiment of the present invention.

FIG. 2 illustrates an embodiment of a system utilizing a capture device. In FIG. 2, the router 210 is also connected to a capture system 200 in addition to the Internet 202 and LAN 212. Generally, the router 210 transmits the outgoing data stream to the Internet 202 and a copy of that stream to the capture system 200. The router 210 may also send incoming data to the capture system 200 and LAN 212.

However, other configurations are possible. For example, the capture system 200 may be configured sequentially in front of or behind the router 210. In systems where a router is not used, the capture system 200 is located between the LAN 212 and the Internet 202. In other words, if a router is not used the capture system 200 forwards packets to the Internet 202. In one embodiment, the capture system 200 has a user interface accessible from a LAN-attached device such as a client 206.

The capture system 200 intercepts data leaving a network such as LAN 212. In an embodiment, the capture system also intercepts data being communicated internally to a network such as LAN 212. The capture system 200 reconstructs the documents leaving the network and stores them in a searchable fashion. The capture system 200 is then used to search and sort through all documents that have left the network. There are many reasons such documents may be of interest, including network security reasons, intellectual property concerns, corporate governance regulations, and other corporate policy concerns. Exemplary documents include, but are not limited to, Microsoft Office documents (such as Word, Excel, etc.), text files, images (such as JPEG, BMP, GIF, PNG, etc.), Portable Document Format (PDF) files, archive files (such as GZIP, ZIP, TAR, JAR, WAR, RAR, etc.), email messages, email attachments, audio files, video files, source code files, executable files, etc.

Capture System

Figure 3:
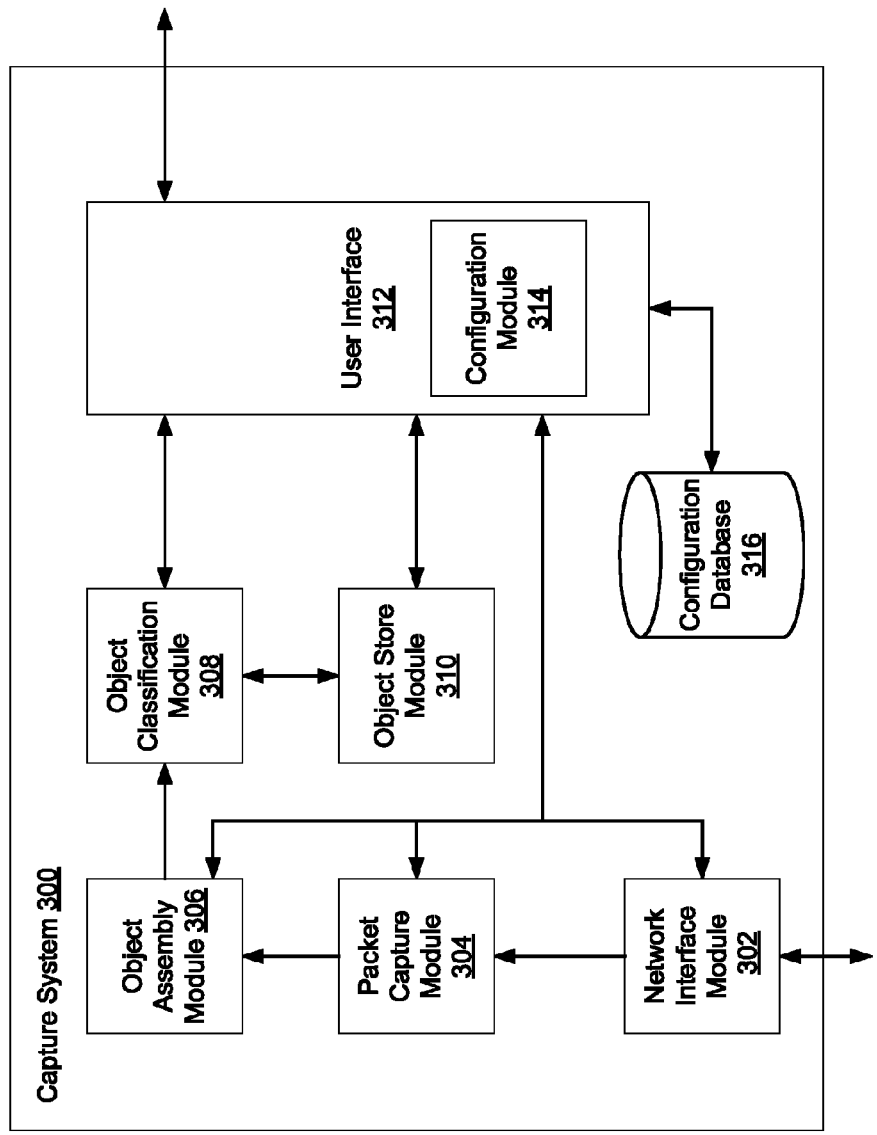
FIG. 3 is a block diagram illustrating the capture system according to one embodiment of the present invention.

FIG. 3 shows an embodiment of a capture system in greater detail. A capture system (such as capture system 200 or 300) may also be referred to as a content analyzer, content/data analysis system, or other similar name. For simplicity, the capture system has been labeled as capture system 300. However, the discussion regarding capture system 300 is equally applicable to capture system 200. A network interface module 302 receives (captures) data, such as data packets, from a network or router. Exemplary network interface modules 302 include network interface cards (NICs) (for example, Ethernet cards—wired or wireless connections). More than one NIC may be present in a capture system.

This captured data is passed from the network interface module 302 to a packet capture module 304 which extracts packets from the captured data. The packet capture module 304 may extract packets from streams with different sources and/or destinations. One such case is asymmetric routing where a packet sent from source "A" to destination "B" travels along a first path and responses sent from destination "B" to source "A" travel along a different path. Accordingly, each path could be a separate "source" for the packet capture module 304 to obtain packets. Additionally, packet data may be extracted from a packet by removing the packet's header and checksum.

When an object is transmitted, such as an email attachment, it is broken down into packets according to various data transfer protocols such as Transmission Control Protocol/Internet Protocol ("TCP/IP"), UDP, HTTP, etc. An object assembly module 306 reconstructs the original or a reasonably equivalent document from the captured packets. For example, a PDF document broken down into packets before being transmitted from a network is reassembled to form the original, or reasonable equivalent of the, PDF from the captured packets associated with the PDF document. A complete data stream is obtained by reconstruction of multiple packets. The process by which a packet is created is beyond the scope of this application.

Figure 4:
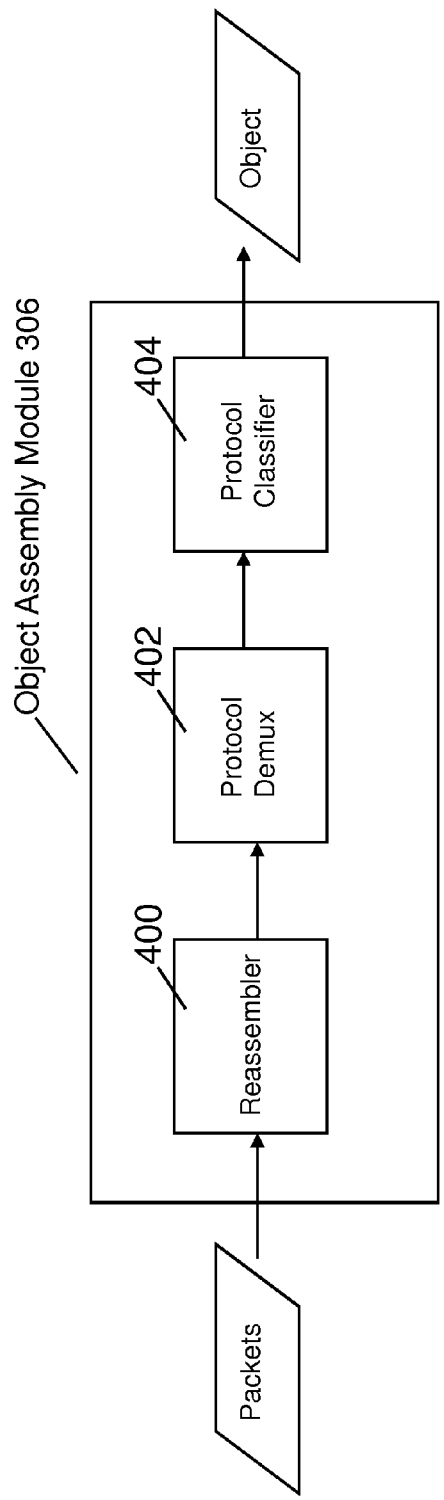
FIG. 4 is a block diagram illustrating an object assembly module according to one embodiment of the present invention.

FIG. 4 illustrates a more detailed embodiment of object assembly module 306. This object assembly module includes a re-assembler 400, protocol demultiplexer ("demux") 402, and a protocol classifier 404. Packets entering the object assembly module 304 are provided to the re-assembler 400. The re-assembler 400 groups (assembles) the packets into at least one unique flow. A TCP/IP flow contains an ordered sequence of packets that may be assembled into a contiguous data stream by the re-assembler 400. An exemplary flow includes packets with an identical source IP and destination IP address and/or identical TCP source and destination ports. In other words, the re-assembler 400 assembles a packet stream (flow) by sender and recipient. Thus, a flow is an ordered data stream of a single communication between a source and a destination. In an embodiment, a state machine is maintained for each TCP connection which ensures that the capture system has a clear picture of content moving across every connection.

The re-assembler 400 begins a new flow upon the observation of a starting packet. This starting packet is normally defined by the data transfer protocol being used. For example, the starting packet of a TCP flow is a "SYN" packet. The flow terminates upon observing a finishing packet (e.g., a "Reset" or "FIN" packet in TCP/IP) or via a timeout mechanism if the finished packing is not observed within a predetermined time constraint.

A flow assembled by the re-assembler 400 is provided to a protocol demultiplexer ("demux") 402. The protocol demux 402 sorts assembled flows using ports, such as TCP and/or UDP ports, by performing speculative classification of the flow's contents based on the association of well known port numbers with specified protocols. For example, because web Hyper Text Transfer Protocol (HTTP) packets, such as, Web traffic packets, are typically associated with TCP port 80, packets that are captured over TCP port 80 are speculatively classified as being HTTP. Examples of other well known ports include TCP port 20 (File Transfer Protocol ("FTP")), TCP port 88 (Kerberos authentication packets), etc. Thus, the protocol demux 402 separates the flows by protocols.

A protocol classifier 404 further sorts flows. The protocol classifier 404 (operating either in parallel or in sequence to the protocol demux 402) applies signature filters to a flow to identify the protocol based solely on the transported data. The protocol classifier 404 uses a protocol's signature(s) (i.e., the characteristic data sequences of a defined protocol) to verify the speculative classification performed by the protocol demux 402. If the protocol classifier 404 determines that the speculative classification is incorrect it overrides it. For example, if an individual or program attempted to masquerade an illicit communication (such as file sharing) using an apparently benign port (for example, TCP port 80), the protocol classifier 404 would use the HTTP protocol signature(s) to verify the speculative classification performed by protocol demux 402.

Protocol classification helps identify suspicious activity over non-standard ports. A protocol state machine is used to determine which protocol is being used in a particular network activity. This determination is made independent of the port or channel on which the protocol is active. As a result, the capture system recognizes a wide range of protocols and applications, including SMTP, FTP, HTTP, P2P, and proprietary protocols in client-server applications. Because protocol classification is performed independent of which port number was used during transmission, the capture system monitors and controls traffic that may be operating over non-standard ports. Non-standard communications may indicate that an enterprise is at risk from spyware, adware, or other malicious code, or that some type of network abuse or insider threat may be occurring.

The object assembly module 306 outputs each flow, organized by protocol, representing the underlying objects being transmitted. These objects are passed to the object classification module 308 (also referred to as the "content classifier") for classification based on content. A classified flow may still contain multiple content objects depending on the protocol used. For example, a single flow using HTTP may contain over 100 objects of any number of content types. To deconstruct the flow, each object contained in the flow is individually extracted and decoded, if necessary, by the object classification module 308.

The object classification module 308 uses the inherent properties and/or signature(s) of various documents to determine the content type of each object. For example, a Word document has a signature that is distinct from a PowerPoint document or an email. The object classification module 308 extracts each object and sorts them according to content type. This classification prevents the transfer of a document whose file extension or other property has been altered. For example, a Word document may have its extension changed from .doc to .dock but the properties and/or signatures of that Word document remain the same and detectable by the object classification module 308. In other words, the object classification module 308 functions beyond simple extension filtering.

According to an embodiment, a capture system uses one or more of six mechanisms for classification: 1) content signature; 2) grammar analysis; 3) statistical analysis; 4) file classification; 5) document biometrics; and 6) concept maps.

Content signatures are used to look for predefined byte strings or text and number patterns (i.e., Social Security numbers, medical records, and bank accounts). When a signature is recognized, it becomes part of the classification vector for that content. While beneficial when used in combination with other metrics, signature matching alone may lead to a high number of false positives.

Grammar analysis determines if an object's content is in a specific language and filters accordingly based on this information. Various types of content have their own grammar or syntax. For example, "C" source code uses "if/then" grammar. Legal documents, resumes, and earnings results also have a particular grammar. Grammar analysis also enables an organization to detect the presence of non-English language-based content on their network.

File classification identifies content types regardless of the extensions applied to the file or compression. The file classification mechanism looks for specific file markers instead of relying on normal telltale signs such as .xls or .pdf.

Document biometrics identifies sensitive data even if the data has been modified. Document biometrics recognizes content rich elements in files regardless of the order or combination in which they appear. For example, a sensitive Word document may be identified even if text elements inside the document or the file name itself have been changed. Excerpts of larger files, e.g., a single column exported from an Excel spreadsheet containing Social Security numbers, may also be identified.

Document biometrics takes "snapshots" of protected documents in order to build a signature set for protecting them. In an embodiment, document biometrics distinguishes between public and confidential information within the same document.

Statistical analysis assigns weights to the results of signature, grammar, and biometric analysis. That is, the capture system tracks how many times there was a signature, grammar, or biometric match in a particular document or file. This phase of analysis contributes to the system's overall accuracy.

Concept maps may be used to define and track complex or unique content, whether at rest, in motion, or captured. Concept maps are based on combinations of data classification mechanisms and provide a way to protect content using compound policies.

The object classification module 306 may also determine whether each object should be stored or discarded. This determination is based on definable capture rules used by the object classification module 306. For example, a capture rule may indicate that all Web traffic is to be discarded. Another capture rule may indicate that all PowerPoint documents should be stored except for ones originating from the CEO's IP address. Such capture rules are implemented as regular expressions or by other similar means.

Filters may be applied based on whether or not a flow is interesting to the capture system (and its operators). For example, emails are typically very interesting to track because they are commonly used to send information (confidential or not) outside of a network. What may not be as interesting, and thus filtered out, is an incoming stream of music from a web-based service such as Yahoo! Music or Napster.

In one embodiment, capture rules are authored by the user(s) of a capture system. The capture system 300 is accessible to any network-connected machine through the network interface module 302 and/or user interface 312. In one embodiment, the user interface 312 is a graphical user interface providing the user with easy access to the various features of the capture system 300 via configuration module 314. For example, the configuration module 314 may provide a capture rule authoring tool. Configuration module 314 creates rules based upon the content of the object intercepted (e.g., particular words, flesh tones in images, etc.), the source or destination of the packets or object (e.g., email address, IP address, etc.), file information (e.g., file size, encryption, etc.), protocol or port information, date or time, or custom parameters (e.g., number of occurrences of particular content, location of particular content within a document, a percentage match, defined patterns such as social security numbers or credit card numbers, etc).

In one embodiment, configuration module 314 enables a user to create a basic rule template, containing as much or as little detail as desired, and save the template in the configuration database. Multiple detailed rules can then be created based upon the template.

Exceptions to the rules may also be provided or created based upon any of the parameters discussed above: for example, special permissions for a CEO as described above.

Actions to be taken by capture system 300 when a rule is violated are also provided or defined in configuration module 314. A rule violation triggers one or more of the following actions: an email notification, syslog notification, the generation of a status message regarding (e.g., new, reviewed, false positive, etc.) the violation for follow-up, and the prevention of transmission of the object that triggered the rule violation. In one embodiment, violation notifications are created using stock language combined with dynamic variables to uniquely identify the violation. For example, the message could include dynamic variables such as "rulename, source.ip, source.user, and source.location" to provide details as to which rule was violated and the source of object that triggered the violation.

In one embodiment, configuration module 314 provides pre-configured capture rules from which the user selects along with an explanation of the operation of such standard included capture rules. Generally, by default, the capture rule(s) implemented by the object classification module 308 captures all objects leaving the network with which the capture system 300 is associated.

The rules, whether authored by a user or provided as a default, are stored in configuration database 316 and applied by the object classification module 308 when determining whether or not to take action in regard to an object. In one embodiment, object classification module 308 accesses rules stored in configuration database 316 via user interface 312. In an alternate embodiment, object classification module 308 accesses rules stored in configuration database 316 directly.

Figure 5:
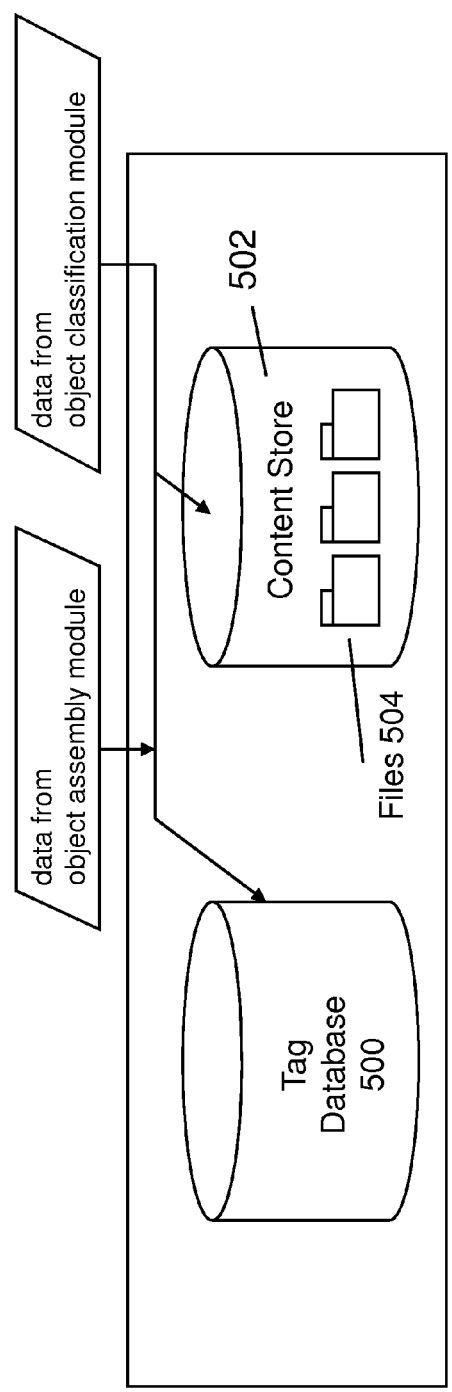
FIG. 5 is a block diagram illustrating an object store module according to one embodiment of the present invention.

If the capture of an object is mandated by one or more capture rules, the object classification module 308 may determine where in the object store module 310 the captured object should be stored or quarantined. FIG. 5 illustrates an embodiment of object store module 310. Accordingly to this embodiment, the object store module 310 includes a tag database 500 and a content store 502. Within the content store 502 are files 504 grouped by content type. For example, if object classification module 308 determines that an object is a Word document that should be stored, it can store it in the file 504 reserved for Word documents. The object store module 510 may be internal to a capture system or external (entirely or in part) using, for example, some network storage technique such as network attached storage (NAS), storage area network (SAN), or other database.

Tag Data Structure

In an embodiment, the content store 502 is a canonical storage location that is simply a place to deposit the captured objects. The indexing of the objects stored in the content store 502 is accomplished using a tag database 500. The tag database 500 is a database data structure in which each record is a "tag" that indexes an object in the content store 502 and contains relevant information about the stored object. An example of a tag record in the tag database 500 that indexes an object stored in the content store 502 is set forth in Table 1:

TABLE 1

| Field Name | Definition (Relevant Information) |
|---|---|
| MAC Address | NIC MAC address |
| Source IP | Source IP address of object |
| Destination IP | Destination IP address of object |
| Source Port | Source port number of object |
| Destination Port | Destination port number of the object |
| Protocol | Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (possibly rule author) |
| Configuration | Capture rule directing the capture of object |
| Signature | Hash signature of object |
| Tag Signature | Hash signature of all preceding tag fields |

There are various other possible tag fields and some tag fields listed in Table 1 may not be used. In an embodiment, the tag database 500 is not implemented as a database and another data structure is used.

The mapping of tags to objects may be obtained by using unique combinations of tag fields to construct an object's name. For example, one such possible combination is an ordered list of the source IP, destination IP, source port, destination port, instance, and timestamp. Many other such combinations including both shorter and longer names are possible. A tag may contain a pointer to the storage location where the indexed object is stored.

The tag fields shown in Table 1 can be expressed more generally, to emphasize the underlying information indicated by the tag fields in various embodiments. Some of the possible generic tag fields are set forth in Table 2:

TABLE 2

| Field Name | Definition |
|---|---|
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. Regarding the content field, the types of content for which the object can be labeled are numerous. Some example choices for content types (as determined, in one embodiment, by the object classification module 308) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of the capture system 300. Only the capture system 300 knows its own private key, thus, the integrity of the stored object can be verified by comparing a hash of the stored object to the signature decrypted with the public key of the capture system 300, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, a message is generated to alert the user that the object displayed may not be identical to the object originally captured.

Figure 6:
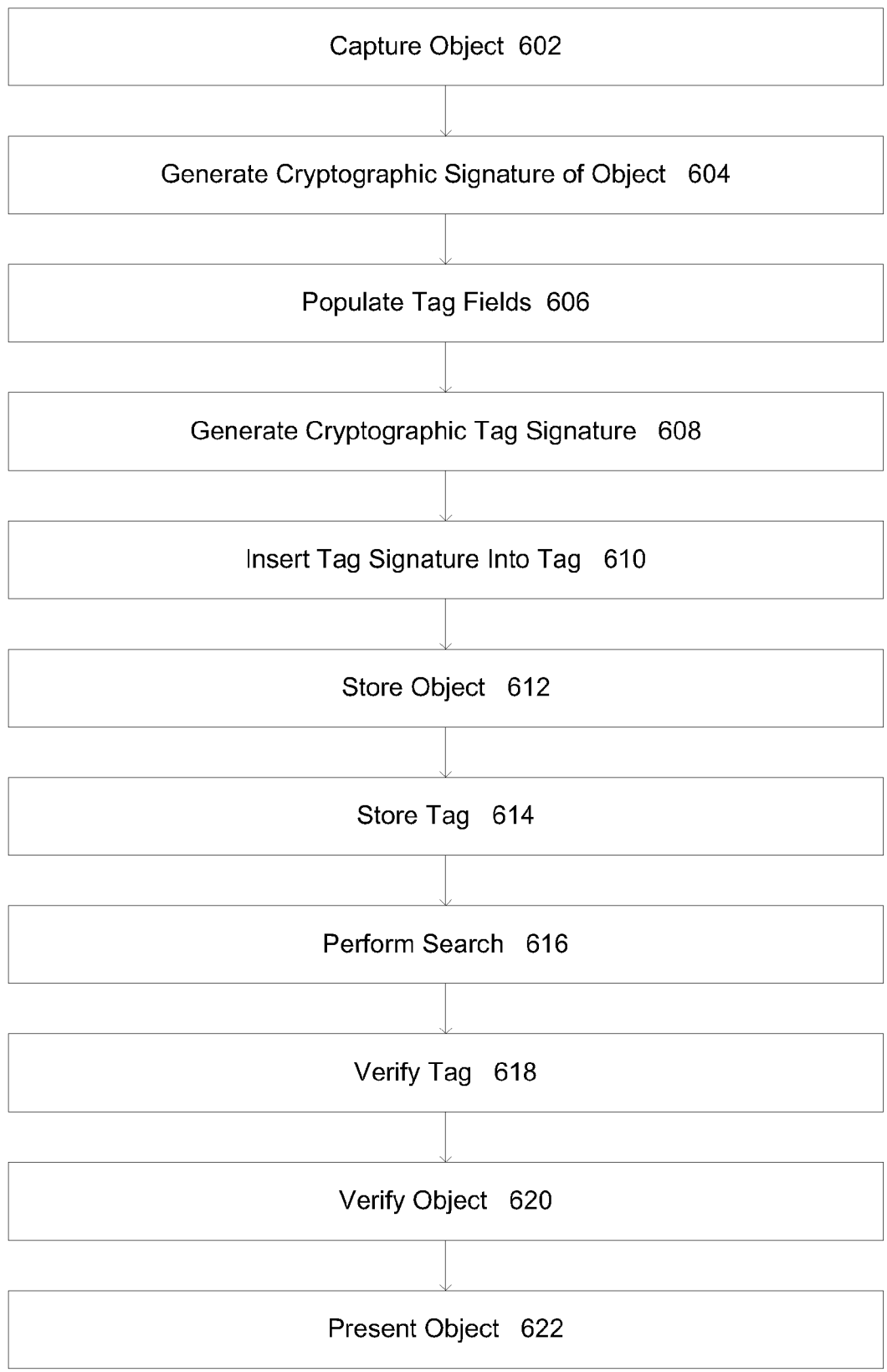
FIG. 6 is a flow diagram illustrating object verification according to one embodiment of the present invention.

FIG. 6 illustrates an embodiment of a process for using the cryptographic signatures. Blocks 602-614 describe object capture, while blocks 616-622 describe object presentation. First, in block 602, the object is captured by the capture system 300 described herein. Then, in block 604, the digital cryptographic signature is generated, e.g., by hashing the object and signing the hash with the private key of the capture system 300. In block 606, all the information gathered by the object assembly module 306 and the object classification module 308 are used to populate the tag fields described herein, such as "Source IP," "Content," "Size," and the digital cryptographic signature is inserted into the appropriate "Signature" field.

In block 608, the cryptographic tag signature over the tag is generated using any known cryptographic method, such as the one used to generate the cryptographic signature over the object in block 604. The cryptographic tag signature is then inserted, in block 610, into the tag in the appropriate "Tag Signature" field. In block 612, the object is stored, e.g., in the content store 502, and in block 614, the tag indexing the object is stored, e.g., in the tag database 500.

In block 616, a search—also sometimes referred to as a mine—is performed over one or more of the tag fields that results in a hit on the tag. For example, the tag indicates a particular source IP in the "Source IP" field that was indicated by the search. Next, in block 618, the tag is verified to ensure that it has not been modified since initial storage in block 614. This can be done by cryptographically verifying the tag signature generated in block 608. For example, the tag signature can be decrypted with the public key of the capture system 300 and compared to a new hash of the tag fields. Other verifications are possible depending on how the tag signature was generated.

In block 620, the object itself is verified by retrieving the object and cryptographically verifying the digital cryptographic signature stored in the "Signature" field. This can be done similarly to the verification of the tag signature in block 618. In both object and tag signature check out, that is, if neither the object nor the tag has been modified since original storage in blocks 612 and 614 respectively, then the object is presented, in bock 622, to the user. Presenting the object can include any method of delivery, including displaying the object to the user via a user interface. If either object or tag has been modified, that is, at least one of the signatures does not check out, the object can still be presented in block 622, but a warning or alert can also be appended to bring the modification to the user's attention.

Object Classification

Figure 7:
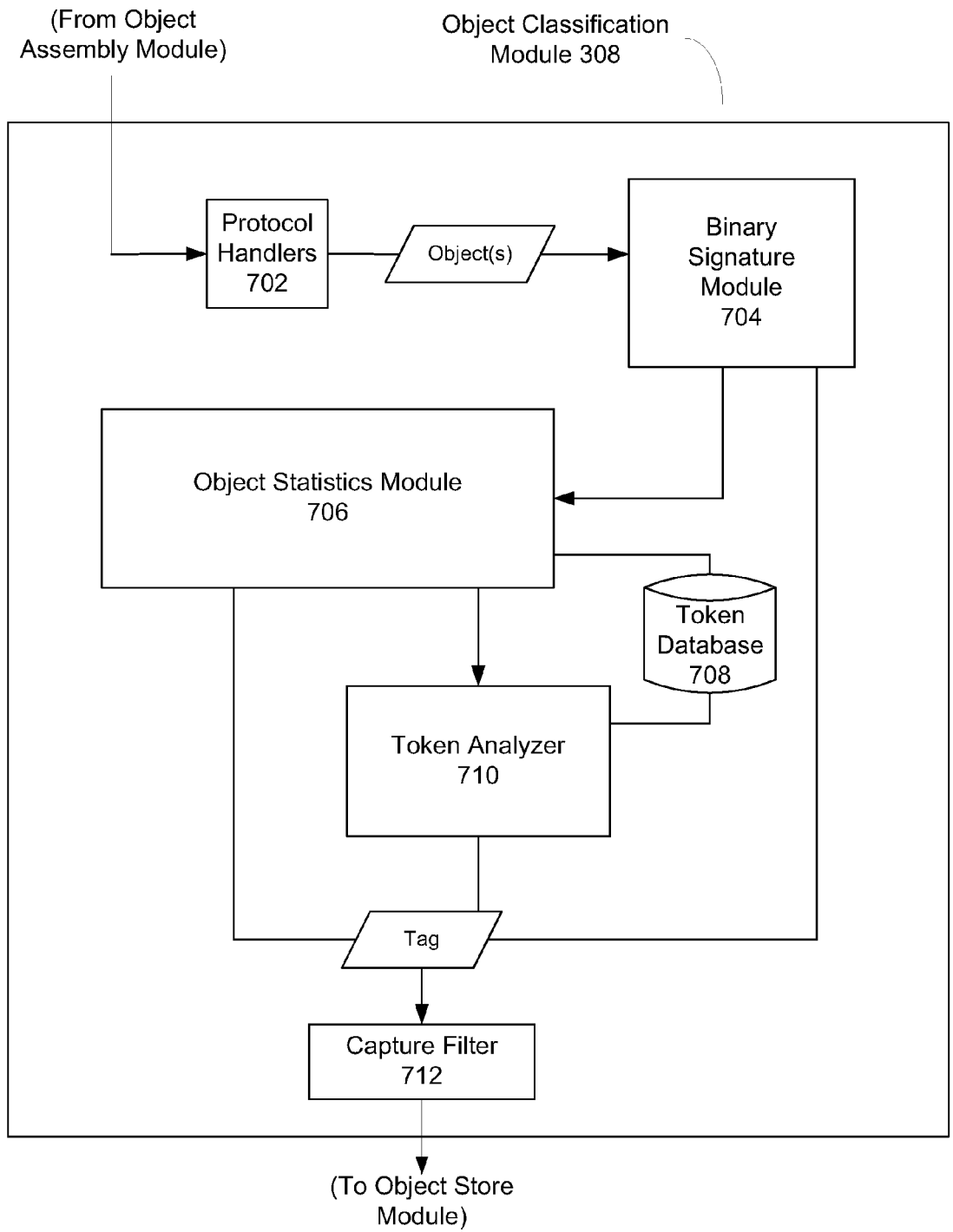
FIG. 7 is a block diagram illustrating an object classification module according to one embodiment of the present invention.

FIG. 7 further illustrates an embodiment of the object classification module 308. As described above, the output of the object assembly module 306 are flows classified by protocol. The object classification module 308 includes a number of protocol handlers 702 designed to extract the objects from a classified flow.

For some protocols, such as HTTP, an off-the-shelf protocol handler can be used. For other protocols, the creator of the protocol may provide a protocol handler. Some protocol handlers 702 are designed especially for the capture system 300. In one embodiment, a protocol handler 702 is included to extract objects from any known transmission protocol, such as HTTP and SMTP. The protocol handlers 702 and object extraction can also be implemented in the object assembly module 306, or in any other module prior to object classification.

Where the object assembly module 306 has been unable to identify the protocol of the flow, the flow is provided to an "unknown protocol handler," included in the list of protocol handlers 702. The unknown protocol handler extracts the objects contained in the unidentified flow in the absence of a known protocol. In one embodiment, the unknown protocol handler classifies the entire received flow as a single object. For example, classifying the entire unknown flow as one object can address the difficulty associated with classifying FTP data flows. Other embodiments for the operation of the unknown protocol handler are described further below.

The extracted object (or objects) is input for the binary signature module 704. The binary signature module 704 attempts to classify an object based on binary signatures found inside the object. Binary signatures result from the content encapsulating software operating in some unique manner.

Binary signatures may be inserted intentionally or unintentionally. For example, the binary signature of a Bit Torrent object is the string "BitTorrent" seen at the very beginning of the object. Similarly, all Microsoft Office documents begin with a 32-bit Microsoft identifier based on which each office document can be classified. As another example, JPEG images contain the string "JFIF" at the ninth byte of the object, and the twelfth byte of the object is 0x30 in hexadecimal notation.

Binary signatures may be collected from various sources, such as UNIX "Magic Files," or additional research and observation. In one embodiment, the signature database containing the signatures of known content types is updated regularly. Signatures can change or become obsolete, while new signatures may be added to known content types or because of new content types.

If the binary signature module 704 is able to classify the object by content, then the content classification is inserted into the "Content" field of the tag data structure set forth above. If, however, the binary signature module 704 is unable to classify the object, i.e., the object did not match any known signatures, then the object is provided to the object statistics module 706.

The object statistics module 706 performs various statistical calculations on the object and reaches one or more conclusions based on the results of these calculations. Specifically, in one embodiment, the object statistics module 706 determines whether the object is binary or textual in nature, and, if binary, whether it is encrypted, or, if textual, what type of text the object contains.

One statistical analysis performed by the object statistics module 706 calculates the frequency of the bytes contained in the object. If all 256 possible bytes occur with statistically even frequency, then the object is processed further as a binary object. If, however, certain bytes associated with textual formats—such as ASCII, extended ASCII, or Unicode)—are seen with elevated frequencies, then the object is processed as a text object.

If the object is determined to be binary data, then the object statistics module 706 performs a distribution analysis (e.g., calculating the variance of the byte distibution) to determine whether the bytes are uniformly distributed or not. If the bytes are distributed uniformly (to a statistically significant degree), then the object statistics module 706 classifies the object as content type "crypto," i.e., encrypted data, since most encrypted data appears randomized. If the byte distribution is found to be non-uniform, the object is classified using the catchall "Binary_Unknown" type. The appropriate classification is then inserted into the tag.

If the object is determined to be text (e.g., ASCII), then the object statistics module 706 accesses a token database 708 to statistically analyze whether and/or how many times each token appears in the object. A token may be a word, a phrase, a part of a word, grammatical notations, patterns, syntax, and any other textual data. Tokens may vary in size, but will generally be relatively small, usually between 3 and 12 bytes in length. The tokens need not be stored in a token database 708, any appropriate storage scheme and data structure can be used.

The statistical information associated with the tokens is provided to the token analyzer 710, which classifies the object as one of a number of various text types using the information. Since various textual documents include different types of syntax, grammar, and words, it is possible to classify text objects using such tokens. For example, certain phrases—such as "is a", "the", "and"—appear more regularly in English language text than text in other languages. Similarly, certain tokens—such as "++", "for ("—appear often in certain programming languages.

In one embodiment, the tokens in the token database 708 are organized by content type. In other words, each possible content type has tokens associated with it. Furthermore, each token has a numerical weight associated with it. The token analyzer 710 accesses the token database 708, and calculates a raw number associated with each content type by summing the weights of the tokens found in the object, counting each instance of tokens found more than once. The token analyzer 710 can then classify the object according to the content type with the highest numerical value.

In one embodiment, the tokens in the token database 708 are weighted differently as a function of their frequency and the strength of their association with the specific content type. For example, a common English language word will have a lower weight than a syntax that is highly specific to a certain programming language, such as C++, or other documentation language, such as Verilog.

The token analyzer 710 assigns a confidence to its classification. For example, if the token summation for Verilog tokens present in an object is twice the total of other content type tokens, then the confidence in a Verilog classification is relatively high. If, however, two or more content types have token sums that are closer together, the confidence that the content type with the highest token sum is the correct classification is lower. The confidence can be expressed numerically, by ranger, or as a percentage.

In one embodiment, the token analyzer 710 performs object classification using Bayesian statistics, which naturally indicate the probability of the correctness of the classification. For Bayesian analysis the token analyzer only needs to know which tokens are present in the object, but not how many times each token was observed in the object. Based on this input, Bayesian statistics can provide the probability of the object being each of the content types. The highest probability content type can be the classification received by the object.

The probability that the object is the classified content type provided by Bayesian statistics can be converted to, or used as, a confidence in the object classification. In one embodiment, where two (or more) content types are close in probability, both as stored in the content field of the tag, with the appropriate probabilities.

Figure 8:
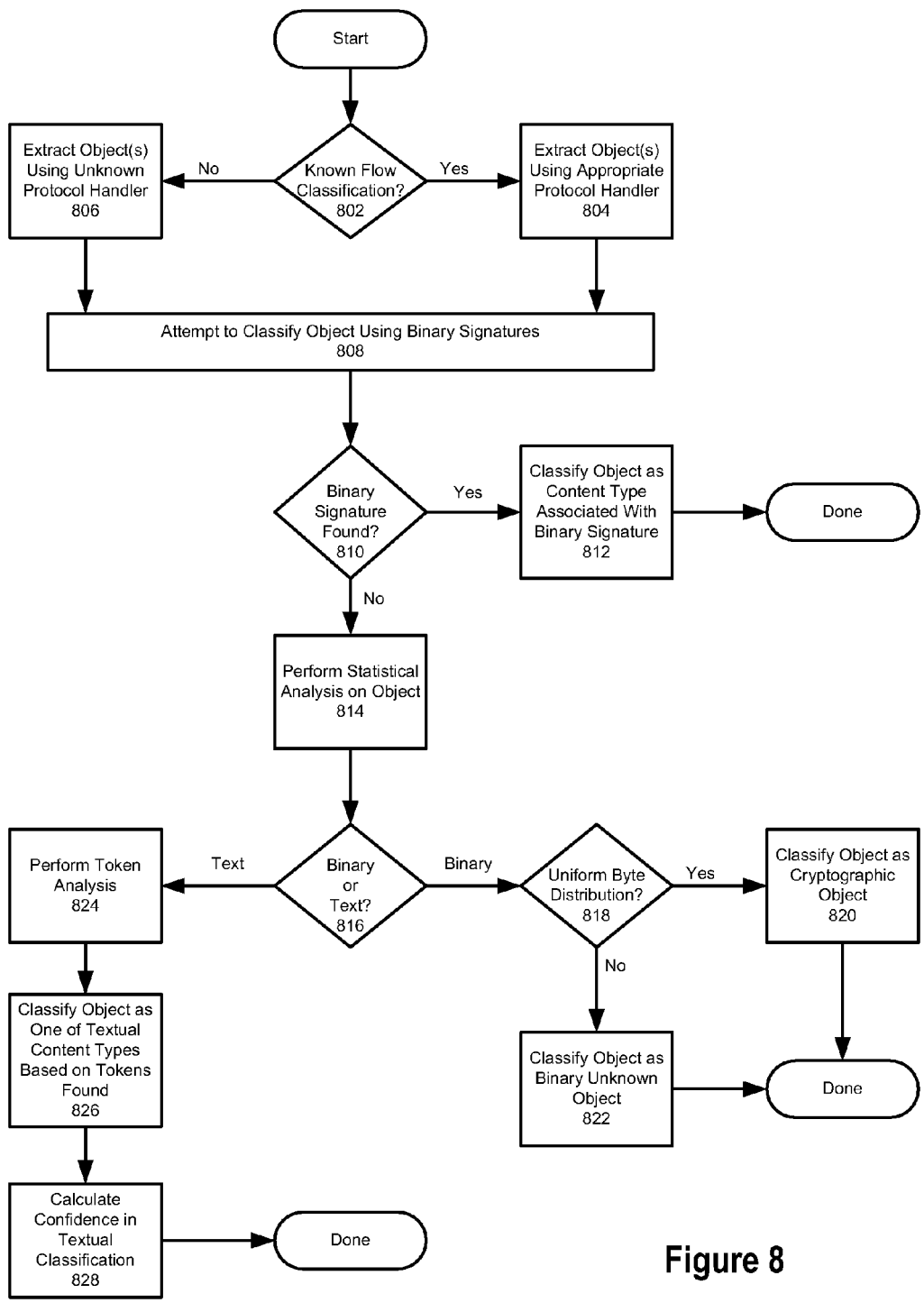
FIG. 8 is a flow diagram illustrating object classification processing according to one embodiment of the present invention.

FIG. 8 illustrates an embodiment demonstrating object classification as a flow diagram. The input for object classification remains the captured, assembled, and classified flow of packets. In block 802, a determination is made as to whether the protocol carrying the flow is known. If yes, then in block 804 the appropriate protocol handler associated with the known protocol (e.g., HTTP) is called to extract one or more objects from the flow.

If, on the other hand, the protocol is not determinable or unknown (e.g., an FTP data flow), then in block 806 the unknown protocol handler is called to extract the objects from the flow. In one embodiment, the unknown protocol handler outputs the entire flow as an object. In another embodiment the unknown protocol handler employs methods similar to those discussed with reference to object classification to extract objects from the unclassifiable flow.

The unknown protocol handler traverses the unknown flow looking for statistically strong binary signatures. If a probable binary signature is found the object embedded in the unknown flow can be simultaneously extracted and classified based on the binary signature without a priori knowledge of the underlying protocol of the flow.

The unknown protocol handler is configured to identify textual domains—also referred to as ASCII domains—which are regions of the flow identified by a strong ASCII statistical components. If a textual domain is identified in the unclassified flow, the token classification method described above may be employed to extract and classify the textual object content contained in the flow.

After one or more objects are extracted, processing can proceed object by object, or in parallel on a per object basis. In block 808, an attempt is made to classify the object using binary signatures, as set forth above. If in block 810 it is determined that a binary signature has been found, then the object is classified based on the binary signature in block 812 and the processing terminates.

On the other hand, if binary signature classification fails, then in block 814, statistical analysis is performed on the object. This can include, but is not limited to, byte analysis (e.g., how many times each possible byte occurred in the object), byte distribution analysis (e.g., how were the bytes distributed across the object), token presence analysis (e.g., what known tokens were found in the object), and token frequency analysis (e.g., how many times each token was found in the object).

In block 816, a decision is made as to whether the object is binary or textual in nature. For example, if ASCII character bytes occur more frequently than other bytes, the object may be determined to be textual in nature. However, if all bytes occur with approximately even frequency, then the object is probably binary. If the object is binary, in block 818, a determination is made as to whether the byte distribution is uniform, based on the analysis performed in block 814.

If the distribution of the bytes throughout the object is uniform—defined for example as the variance or standard deviation of the bytes being below three sigma (3σ) or some other threshold—then the object is classified as a cryptographic object in block 820. In other words, the object is determined to include content that is encrypted by some cryptographic method, and the processing terminates. If, the byte distribution is found to be non-uniform (i.e., non-random), then the object is classified as a binary unknown object in block 822, and the processing terminates.

If, in block 816 the object was determined to be textual in nature, then token analysis is performed on the object in block 824. Token analysis can include calculating totals of token weights found in the object, performing Bayesian statistics of content types based on tokens present in the object, or any other token-based method of determining content type. Based on the calculations performed in block 824, the object is classified as some textual content type in block 826.

In block 828, the confidence of the classification of block 826 is calculated. The confidence may be based on a Bayesian statistic, a comparison of weight sums of other content types, or some other statistical method. The object classification processing then terminates. The object classification derived as a result of the processing can then be used to populate a tag describing the object, or can be associated with the object in some other way, e.g., in a database.

Rule Parser

As described above, the object classification module 308 determines whether each captured object/document should be stored. This determination is based on capture rules provided by a user or pre-configured system settings. In one embodiment, the capture rules can specify which captured objects should be stored based on the information collected in the tag associated with the object, such as content type, source IP, etc. Thus, the capture system 300 includes—e.g., in the object classification module 308, or as an independent module—a capture filter configured to make a determination about what to do with each captured object.

Figure 9:
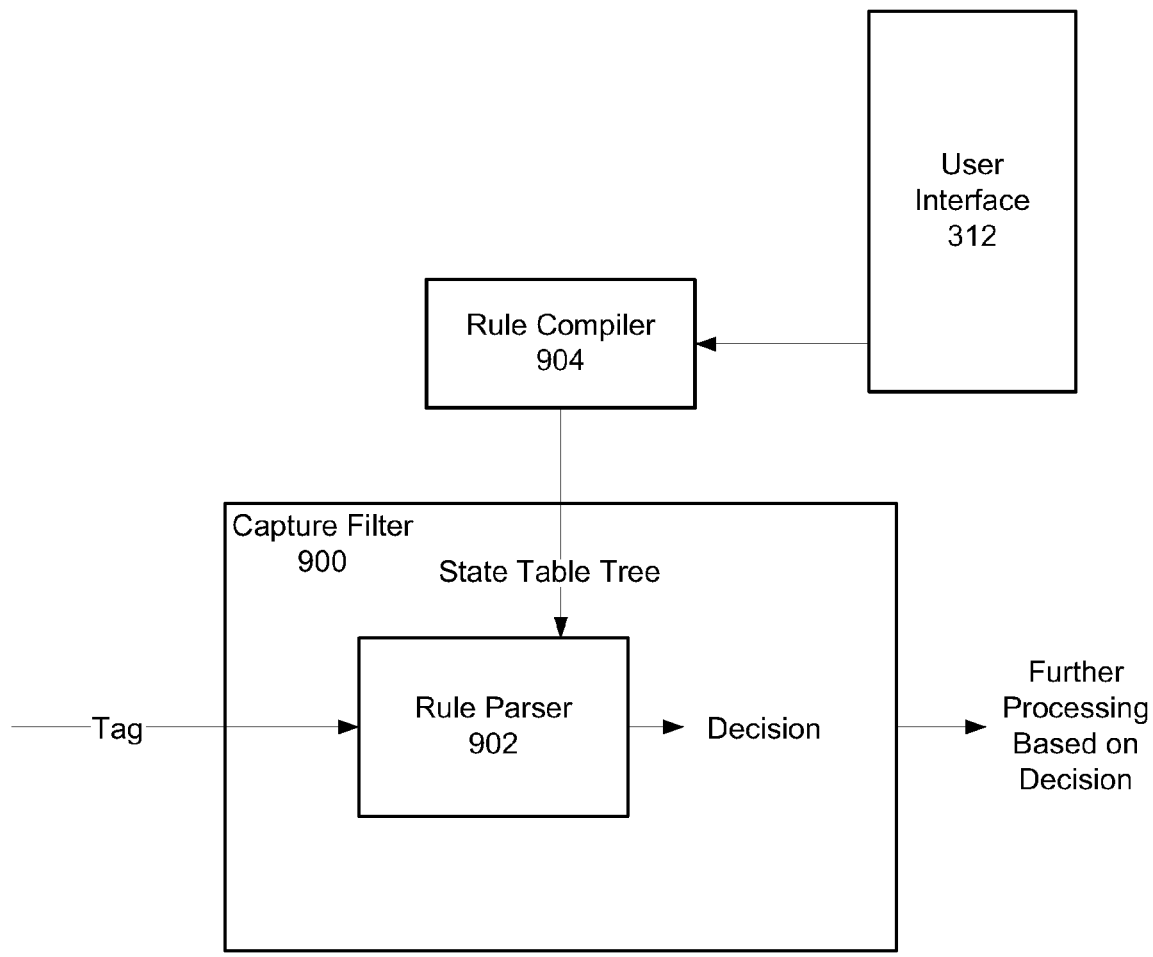
FIG. 9 is a block diagram illustrating a rule compiler and a capture filter according to one embodiment of the present invention.

FIG. 9 illustrates an embodiment of capture filter 900. The capture filter 900 receives as input a tag associated with a captured object—e.g., such as a tag described with reference to Tables 1 and 2. The tag is provided to a rule parser 902 that parses all the capture rules over the tag to see if it satisfies any of the capture rules.

The rule parser 902 provides the capture filter 900 with a decision based on which, if any, rules applied to the tag. The decision can be any decision supported by capture system 300, such as store the object, discard the object, log the object, etc. The capture filter 900 then directs further processing of the captured object and its tag based on the decision. For example, if a capture rule indicating that an object should be stored is hit by the tag, then the capture filter 900 will cause the object and its tag to be stored in the object store module 310.

Figure 10:
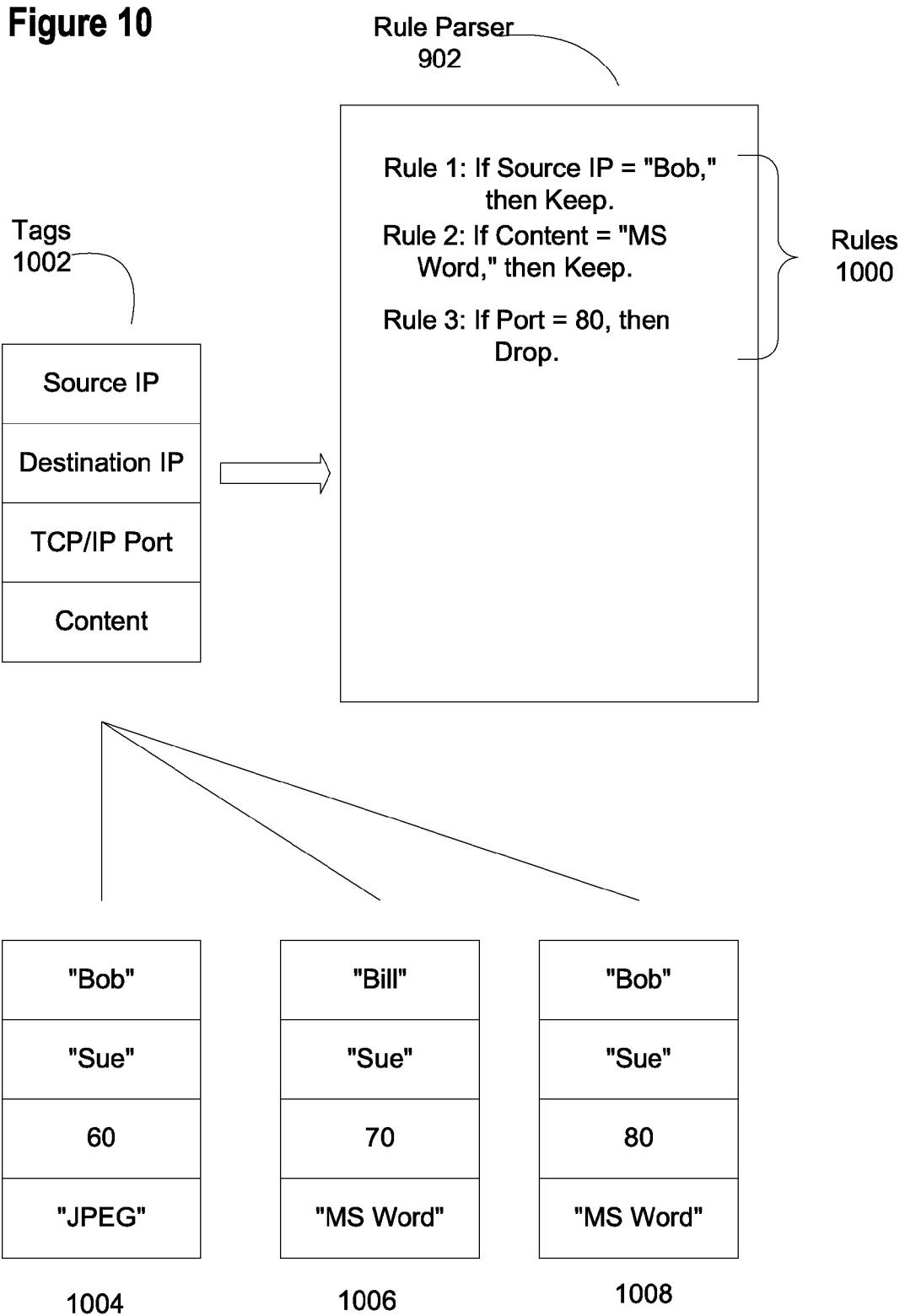
FIG. 10 illustrates an example of tags being parsed using rules according to one embodiment of the present invention.

FIG. 10 provides an illustration of the operation of the rule parser 902. The rule parser 902 applies rules 1000 to tags 1002 associated with objects. For example, given the rules 1000, the object described by tag 1004 is kept because it hit Rule 1: its source IP is associated with Bob. The object described by tag 1006 is kept because it hit Rule 2: its content is a MS Word document. Additionally, rules are not orthogonal, i.e., one tag can hit more than one rule, and rules have a precedence order. The object described by tag 1008 hit all three rules, so it is kept or dropped depending on which of the three rules has precedence. If either Rule 1 or 2 has precedence over Rule 3, then the object is kept, otherwise, it is dropped.

Referring again to FIG. 9, the rule parser 902 parses all capture rules by traversing a state table tree one time. In one embodiment, the state table tree is generated by a rule compiler 904 that compiles the capture rules authored by the system users into the state table tree. In one embodiment, the state table tree is a data structure in the form of a tree whose nodes are state tables indicating the state of the parsing. Other appropriate data structures may be used.

Figure 11:
FIG. 11 illustrates a simplified example of rule compiling according to one embodiment of the present invention.

FIG. 11 illustrates an embodiment of the rule compiler 904. Rule compiler 904 translates a rule into a state table chain 1100 and compresses a plurality of rules into a state table tree 1102. The tag 1104 is a six-digit number, with digits ranging from 0-9. There are three rules defined by a pattern that is hit if the tag satisfies the pattern. While simplified, this approach is directly analogous for finding patterns in the tag fields of the capture system 300, or to any similar pattern matching scheme.

Rule 1 is hit if the first three digits (from left to right) of the tag 1104 are "123." Similarly, Rule 2 is hit if the second digit is "4," the third digit is between "5-9," and the fifth digit is "7." Each rule is expressed as a chain of state tables 1106, referred to as a state table chain 1100. The state tables are used by reading digits from left to right from the tag, and using the digits to index into the state tables. In one embodiment, the tag is read on a per byte basis, making each state table 1106 have 256 rows, each having an 8-bit index.

Following the state table chain 1100 for each rule will result in either a HIT or MISS determination for any possible tag. The entries of the state tables either indicate a DONE condition that shows whether the rule was hit or missed by the tag 1104, or they indicate a GOTO condition to continue parsing the next table to be used. An entry can also indicate whether the reading of the digits should skip ahead (or backwards) when indexing into the next table.

In one embodiment, the rule compiler 904 generates the state table tree 1102 by compressing state table chains 1100. Traversing the state table tree 1102 parses the tag 1104 for all three rules simultaneously. Tag 1104 may be much larger than the example illustrated by FIG. 11. For example, a tag as shown in Table 1 will generally be between 64 and 264 bytes in size. Parsing such a tag on a per-byte basis would involve much larger state tables, longer state table chains, and a more complicated state table tree. However, the underlying concepts would be similar to those described with reference to FIG. 11.

Due to the fact that the state table tree 1102 is a simplified example, it can easily be collapsed into a single-branched tree. However, a state table tree may have more than one branch. In one embodiment, each branch is at most as long as the longest state table chain used to construct the tree. Since tree traversal speed is determined by branch length, such a tree can still traverse all rules within a predictable and fast time. How compressed the state table tree of a real world embodiment is depends on a tradeoff between memory available to store the tree, and speed required to edit the tree (e.g., when the user authors new rules and/or deletes old rules). The tradeoff is that the more compressed the state table tree is the less memory it uses, but the more time it takes to edit.

In one embodiment, rules can be inserted, deleted, or edited at any time. This can be done by de-compiling the state table tree (or relevant portions of the state table tree), making the appropriate changes, and re-compiling the tree. In one embodiment, rules can be edited, inserted, or deleted without affecting the tree to an extent that would require de- and re-compiling. For example, the state table tree 1102 contains state table 4:4 as a "leaf node," a node on the tree having no children. More complex state table trees may contain many leaf nodes. Since leaf nodes have no children (i.e., do not effect further processing), if a new, edited, or deleted rule only affects a leaf nodes, then the edit can be implemented without de-compiling and re-compiling any parts of the tree. This results in a highly efficient method of inserting, deleting, and editing some rules.

FIG. 12 illustrates an embodiment of state table entry 1200 for a state table 1106. The entry includes index 1202. The index 1202 is the value used to index into the state table 1106. For example, if the tag were read byte by byte (8 bits), then the index 1202 would be 8 bits long, ranging in decimal value from 0 to 255 (00000000 to 11111111 in binary).

State table entry 1200 also includes a status indicator 1204. The status indicator 1204 provides information about the status of the rule matching. In one embodiment, there are three possible statuses being indicated: HIT, MISS, and NOT DONE. A HIT status indicates that a rule has been hit and the parsing is finished. A MISS status indicates that the tag cannot possibly hit any rules included in the state table tree, and the parsing is finished. A NOT DONE status indicates that no determination about HIT or MISS conditions can be made at the present time.

State table entry 1200 includes a rule match indicator 1206 that is accessed if the status indicator 1204 shows a HIT condition. In one embodiment, the rule match indicator 1206 identifies the rule that is hit (e.g., rule 3). In one embodiment, the rule is not identified by name, and the rule match indicator 1206 contains the next point of program execution, which is determined by the rule hit.

A MISS condition indicated by the status indicator 1204 results in the accessing of the exit location indicator 1208. In one embodiment, the exit location indicator 1208 contains the next point of program execution, which is configured to take into account that none of the rules were hit. In one embodiment, program execution may continue from a single place after flags indicating the results of the parsing have been set.

A NOT DONE condition indicates that the forward/reverse operator 1210 should be accessed. The forward/reverse operator 1210 indicates how many positions to go forwards or backwards (e.g., GOTO) before reading the next unit of the tag. The forward/reverse operator can be implemented as a number that can take positive or negative values indicating how many bytes (or other units of reading the tag) to skip and in what direction.

State table entry 1200 also includes a next table location indicator 1212 identifying the next state table of the state table tree into to which the next byte of tag will index.

Figure 13:
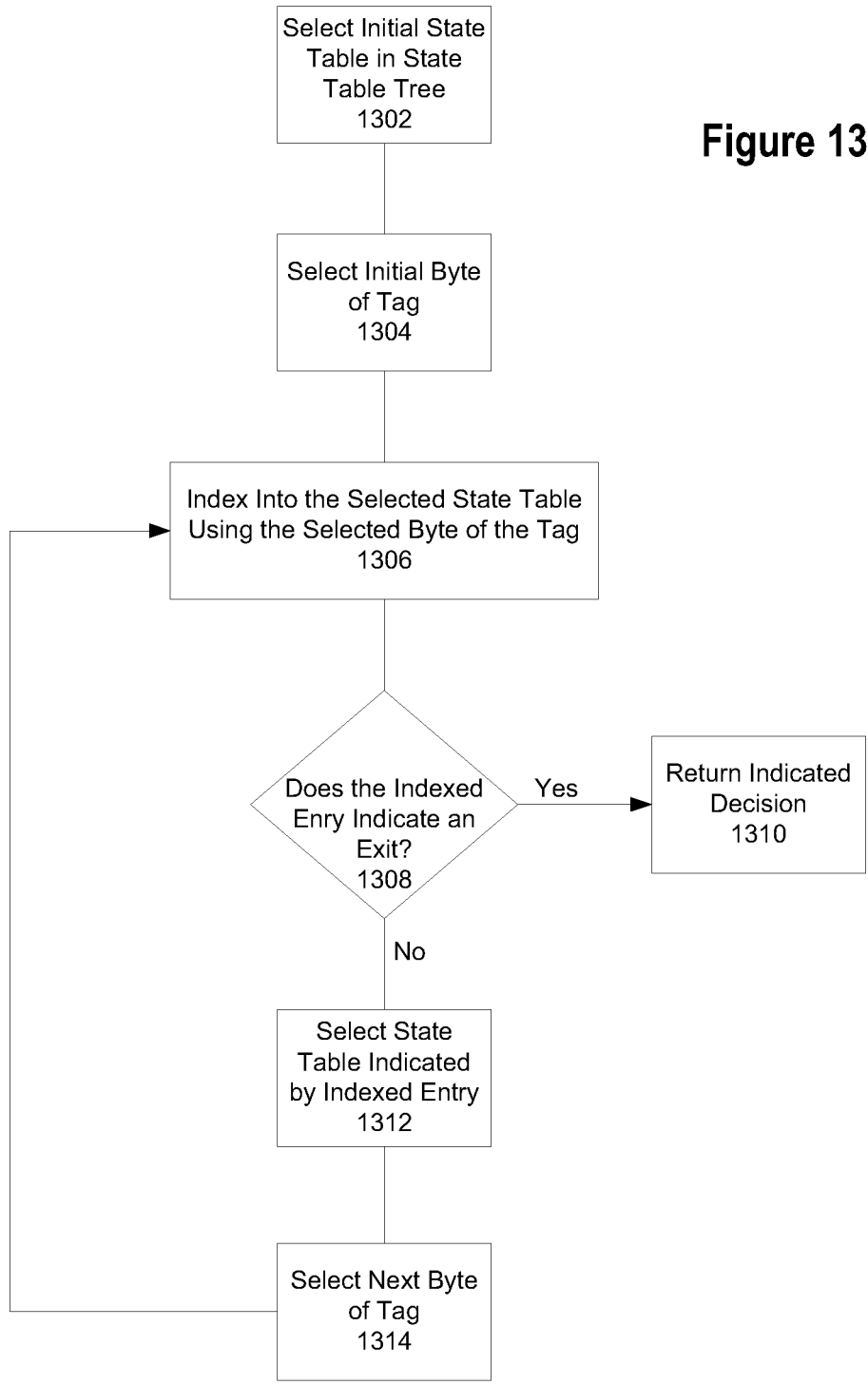
FIG. 13 is a flow diagram illustrating a rule parsing method according to one embodiment of the present invention.

FIG. 13 is a flow diagram illustrating one embodiment of parsing a tag using the state table tree. The initial (root) state table node of the tree is selected in block 1302. The initial byte of the tag being parsed is selected in block 1304. The selected state table is indexed into using the selected byte in block 1306, as described above.

In block 1308, a decision is made as to whether the indexed state table entry is indicating an exit. If yes, then, in block 1310, the decision reached is indicated. For example, a decision may be "Rule 2 hit," or "Global Miss." If an exit is not indicated, i.e., if rule parsing is not finished, then, in block 1312, the next state table node of the state table tree is selected, e.g., as indicated by the indexed entry.

In block 1314, the next byte of the tag is read. This could include performing a forward or backward skip, if one is indicated by the indexed entry, or it may include sequentially inputting the next byte if no jump is required. Then, the processing proceeds again from block 1306, using the newly selected state table and tag byte as inputs. This process continues until parsing is complete.

Document Registration

In one embodiment, the capture system described above implements a document registration scheme. A user registers a document with a capture system, the system then alerts the user if all or part of the content in the registered document is attempting to leave, or leaving, the network. Thus, unauthorized documents of various formats (e.g., Microsoft Word, Excel, PowerPoint, source code of any kind, and text) are prevented from leaving an enterprise. There are great benefits to any enterprise that keeps its intellectual property, and other critical, confidential, or otherwise private and proprietary content from being mishandled. Sensitive documents are typically registered with the capture system 200, although registration may be implemented using a separate device.

Figure 14:
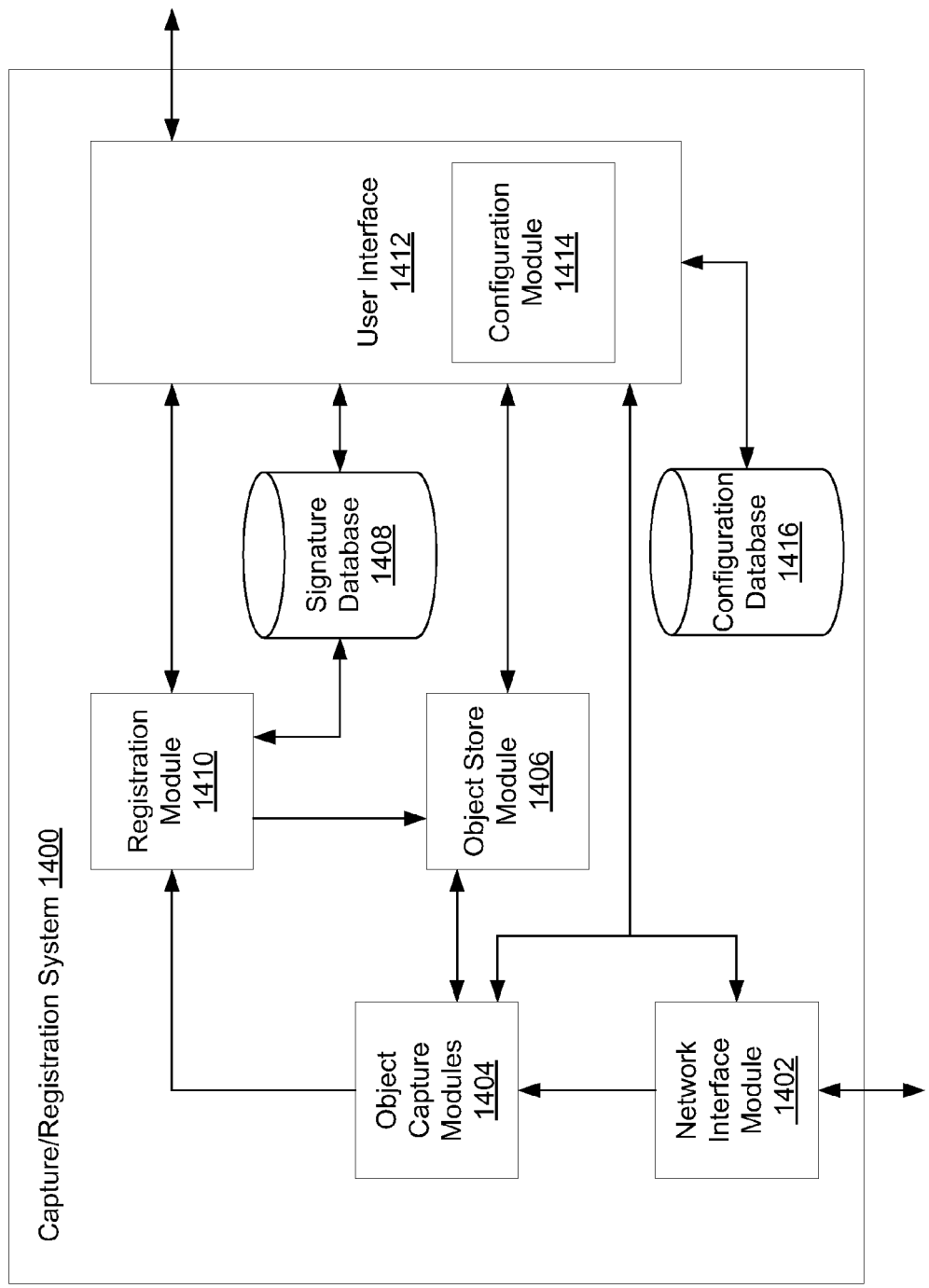
FIG. 14 is a block diagram illustrating a document registration system according to one embodiment of the present invention.

FIG. 14 illustrates an embodiment of a capture/registration system. The capture/registration system 1400 has components which are used in a similar or identical way to those of the capture system 300 shown in FIG. 3, including the network interface module 1402, object capture modules 1404, the object store module 1406, user interface 1412, configuration module 1414, and configuration database 1416 (the network interface module 302, packet capture module 304, object assembly module 306, object classification 308 module, configuration module 314, and configuration database 316 of FIG. 3).

The capture/registration system 1400 includes a registration module 1410 interacting with a signature storage 1408 (such as a database) to help facilitate a registration scheme. There are numerous ways to register documents. For example, a document may be electronically mailed (e-mailed), uploaded to the registration system 1400 (for example through the network interface module 1402, via the user interface 1412, or through removable media), the registration system 1400 scanning a file server (registration server) for documents to be registered, etc. In one embodiment, a document is registered outside of capture/registration system 1400 (e.g., in a separate capture/registration system) and signatures are provided via user interface 1412. The registration process may be integrated with an enterprise's document management systems. Document registration may also be automated and transparent based on registration rules, such as "register all documents," "register all documents by specific author or IP address," etc.

After being received, classified, etc., a document to be registered is passed to the registration module 1410. The registration module 1410 calculates a signature or a set of signatures of the document. A signature associated with a document may be calculated in various ways. An exemplary signature consists of hashes over various portions of the document, such as selected or all pages, paragraphs, tables and sentences. Other possible signatures include, but are not limited to, hashes over embedded content, indices, headers, footers, formatting information, or font utilization. A signature may also include computations and meta-data other than hashes, such as word Relative Frequency Methods (RFM)—Statistical, Karp-Rabin Greedy-String-Tiling-Transposition, vector space models, diagrammatic structure analysis, etc.

The signature or set of signatures associated on a document is stored in the signature storage 1408. The signature storage 1408 may be implemented as a database or other appropriate data structure as described earlier. In an embodiment, the signature storage 1408 is external to the capture system 1400. In another embodiment, signatures are stored in configuration database 1416.

Registered documents are stored as objects in the object store module 1406 according to the rules set for the system. In an embodiment, only documents are stored in the content store of the object store module 1406. These documents have no associated tag because many tag fields do not apply to registered documents.

As set forth above, the object capture modules 1404 extract objects leaving the network and store various objects based on capture rules. In an embodiment, all extracted objects (whether subject to a capture rule or not) are also passed to the registration module 1410 for a determination whether each object is, or includes part of, a registered document.

The registration module 1410 calculates the set of one or more signatures of an object received from the object capture modules 1404 in the same manner as the calculation of the set of one or more signatures of a document received from the user interface 1412 to be registered. This set of signatures is then compared against all signatures in the signature database 1408. However, parts of the signature database 1408 may be excluded from a search to decrease the amount comparisons to be performed.

A possible unauthorized transmission is detectable if any one or more signatures in the set of signatures of an extracted object matches one or more signatures in the signature database 1408 associated with a registered document. Detection tolerances are usually configurable. For example, the system may be configured so that at least two signatures must match before a document is deemed unauthorized. Additionally, special rules may be implemented that make a transmission authorized (for example, if the source address is authorized to transmit any documents off the network).

Figure 15:
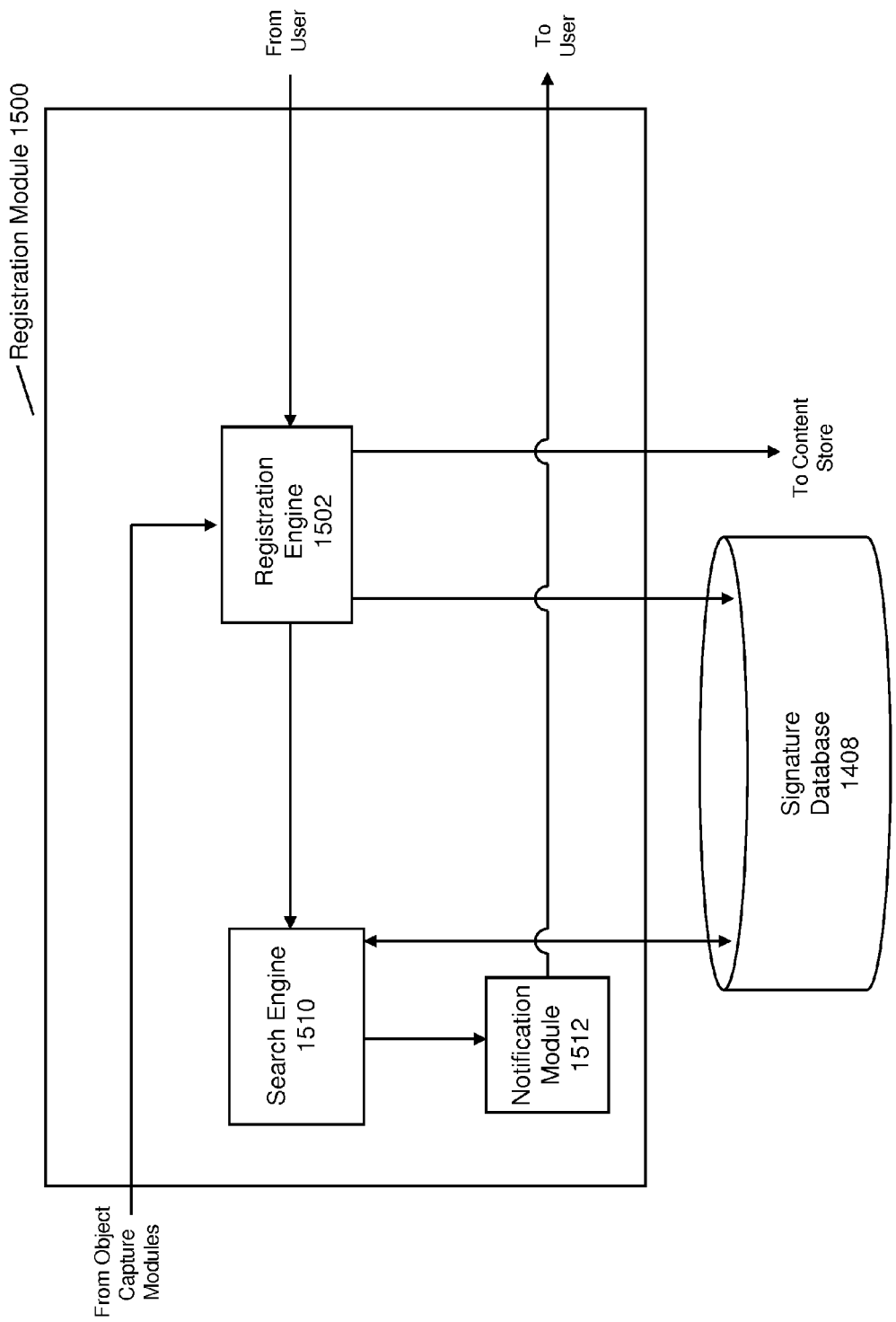
FIG. 15 is a block diagram illustrating registration module according to one embodiment of the present invention.

FIG. 15 illustrates an embodiment of a registration module. As discussed above, a user may select a document to be registered. The registration engine 1502 generates signatures for the document and forwards the document to content storage and the generated signatures to the signature database 1408. Generated signatures are associated with a document, for example, by including a pointer to the document or to some attribute to identify the document.

The registration engine calculates signatures for a captured object and forwards them to the search engine 1510. The search engine 1510 queries the signature database 1408 to compare the signatures of a captured object to the document signatures stored in the signature database 1408. Assuming for the purposes of illustration, that the captured object is a Word document that contains a pasted paragraph from registered PowerPoint document, at least one signature of the registered PowerPoint signatures will match a signature of the captured Word document. This type of event is referred to as the detection of an unauthorized transfer, a registered content transfer, or other similarly descriptive term.

When a registered content transfer is detected, the transmission may be halted or allowed with or without warning to the sender. In the event of a detected registered content transfer, the search engine 1510 may activate the notification module 1512, which sends an alert to the registered document owner. The notification module 1512 may send different alerts (including different user options) based on a default setting or user preference associated with the registration and the capabilities of the registration system.

An alert indicates that an attempt (successful or unsuccessful) to transfer a registered content off the network has been made. Additionally, an alert may provide information regarding the transfer, such as source IP, destination IP, any other information contained in the tag of the captured object, or some other derived information, such as the name of the person who transferred the document off the network. Alerts are provided to one or more users via e-mail, instant message (IM), page, etc. based on the registration parameters. For example, if the registration parameters dictate that an alert is only to be sent to the entity or user who requested registration of a document then no other entity or user will receive an alert.

If the delivery of a captured object is halted (the transfer is not completed), the user who registered the document may need to provide consent to allow the transfer to complete. Accordingly, an alert may contain some or all of the information described above and additionally contain a selection mechanism, such as one or two buttons—to allow the user to indicate whether the transfer of the captured object is eligible for completing. If the user elects to allow the transfer, (for example, because he is aware that someone is emailing a part of a registered document (such as a boss asking his secretary to send an email), the transfer is executed and the captured object is allowed to leave the network.

If the user disallows the transfer, the captured object is not allowed off of the network and delivery is permanently halted. Several halting techniques may be used such as having the registration system proxy the connection between the network and the outside, using a black hole technique (discarding the packets without notice if the transfer is disallowed), a poison technique (inserting additional packets onto the network to cause the sender's connection to fail), placing the object in quarantine and notifying the sender and/or the intended recipient, etc.

Figure 16:
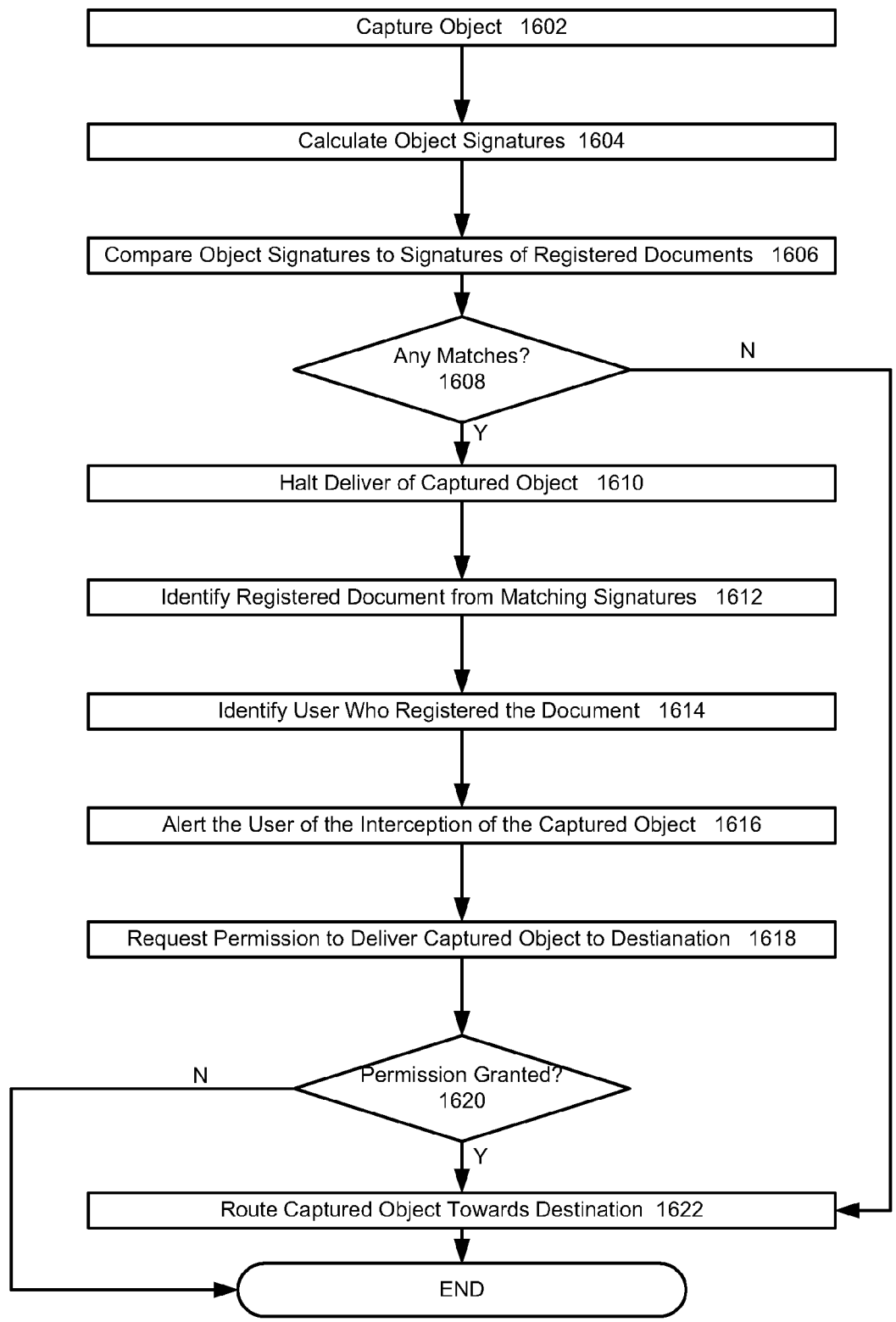
FIG. 16 illustrates an exemplary embodiment of the flow of the operation of a registration module.

FIG. 16 illustrates an embodiment of the flow of the operation of a registration module. An object is captured at 1602. This object was sent from an internal network source and designated for delivery inside and/or outside of the network.

A signature or signatures are generated for this captured object at 1604. This signature or signatures are generated in a manner as described earlier. The signatures of the captured document are compared to the signatures of registered documents at 1606. For example, the search engine 1510 queries the signature database which houses the signatures for registers documents and compares these registered document signatures to the signatures generated for the captured document.

If there are no matches at 1608, then the captured object is routed toward its destination at 1622. This routing is allowed to take place because the captured object has been deemed to not contain any material that has been registered with the system as warranting protection. If there is a match at 1608, further processing is needed.

In an embodiment, the delivery of the captured object is halted at 1610. Halting delivery prevents any questionable objects from leaving the network. Regardless if the delivery is halted or not, the registered document that has signatures that match the captured object's signatures is identified at 1612. Furthermore, the identity of the user or entity that registered the document is ascertained at 1614.

The user or entity of the matching registered document is alerted to this attempt to transmit registered material at 1616. This alert may be sent to the registered user or entity in real-time, be a part of a log to be checked, or be sent to the registered user or entity at a later point in time. In an embodiment, an alert is sent to the party attempting to transmit the captured object that the captured object contains registered information.

A request to allow delivery of the captured object may be made to the registered user or entity at 1618. As described earlier, there are situations in which a captured object that contains registered material should be allowed to be delivered. If the permission is granted at 1620, the captured object is routed toward its destination at 1622. If permission is not granted, the captured object is not allowed to leave the network.

Signature Generation

There are various methods and processes by which the signatures are generated, for example, in the registration engine 1502 in FIG. 15.

Figure 17:
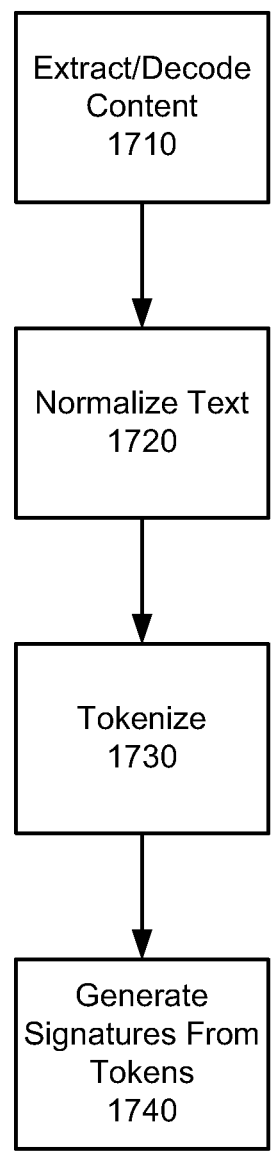
FIG. 17 is a flow diagram illustrating an embodiment of a flow to generate signatures according to one embodiment of the present invention.

One embodiment of a flow to generate signatures is illustrated in FIG. 17. The content of a document (register or intercepted) is extracted and/or decoded depending on the type of content contained in the document at 1710. The content is extracted by removing the "encapsulation" of the document. For example, if the document is a Microsoft Word file, then the textual content of the file is extracted and the specific MS Word formatting is removed. If the document is a PDF file, the content has to be additionally decoded, as the PDF format utilizes a content encoding scheme.

To perform the text extraction/decoding at 1710, the content type of the document is detected (for example, from the tag associated with the document). Then, the proper extractor/decoder is selected based on the content type. An extractor and/or decoder used for each content type extracts and/or decodes the content of the document as required. Several off the shelf products are available, such as the PDFtoText software, may be used for this purpose. In one embodiment, a unique extractor and/or decoder is used for each possible content type. In another embodiment, a more generic extractor and/or decoder is utilized.

The text content resulting from the extraction/decoding is normalized at 1720. Normalization includes removing excess delimiters from the text. Delimiters are characters used to separate text, such as a space, a comma, a semicolon, a slash, tab, etc. For example, the extracted text version of a Microsoft Excel spreadsheet may have two slashes between all table entries and the normalized text may have only one slash between each table entry or it may have one space between each table entry and one space between the words and numbers of the text extracted from each entry.

Normalization may also include delimiting items in an intelligent manner. For example, while credit card numbers generally have spaces between them they are a single item. Similarly, e-mail addresses that look like several words are a single item in the normalized text content. Strings and text identified as irrelevant can be discarded as part of the normalization procedure.

In one embodiment, such evaluations are made by comparison to a pattern. For example, a pattern for a social security number may be XXX-XX-XXXX, XXXXXXXX, or XXX XX XXXX, where each X is a digit from 0-9. An exemplary pattern for an email address is word@word.three-letter-word. Similarly, irrelevant (non-unique) stings, such as copyright notices, can have associated patterns.

The pattern comparison is prioritized in one embodiment. For example, if an email address is considered more restrictive than a proper name and a particular string could be either an email address or a proper name, the string is first tested as a possible email address. A string matching the email pattern is classified as an email address and normalized as such. If, however, it is determined that the string is not an email address, then the string is tested against the proper name pattern (for example, a combination of known names). If this produces a match, then the string is normalized as a proper name. Otherwise the string is normalized as any other normal word.

By comparing the normalization patterns against the string to be normalized in sequence, an implicit pattern hierarchy is established. In one embodiment, the hierarchy is organized such that the more restrictive, or unique, a pattern is, the higher its priority. In other words, the more restrictive the pattern, the earlier it is compared with the string. Any number of normalization patterns useable and the list of patterns may be configurable to account for the needs of a particular enterprise.

Normalization may also include discarding text that is irrelevant for signature generation purposes. For example, text that is known not to be unique to the document may be considered irrelevant. The copyright notice that begins a source code document, such as a C/C++ source file, is generally not relevant for signature generation, since every source code document of the enterprise has the identical textual notice and would be ignored. Irrelevant text is identified based on matching an enumerated list of known irrelevant text or by keeping count of certain text and thus identifying frequently reoccurring strings (such as strings occurring above a certain threshold rate) as non-unique and thus irrelevant. Other processes to identify irrelevant text include, but are not limited to, identification through pattern matching, identification by matching against a template, and heuristic methods requiring parsing of examples of other documents of the same type.

The delimited text items of the normalized text content are tokenized, and, converted into a list of tokens at 1730. In one embodiment, tokenizing involves only listing the delimited items. In another embodiment, each item is converted to a token of fixed size. Text items may be hashed into a fixed or configurable hash site such as binary number (for example, an 8-bit token). An exemplary hash function that may be used for tokenizing is MD5.

Figure 18:
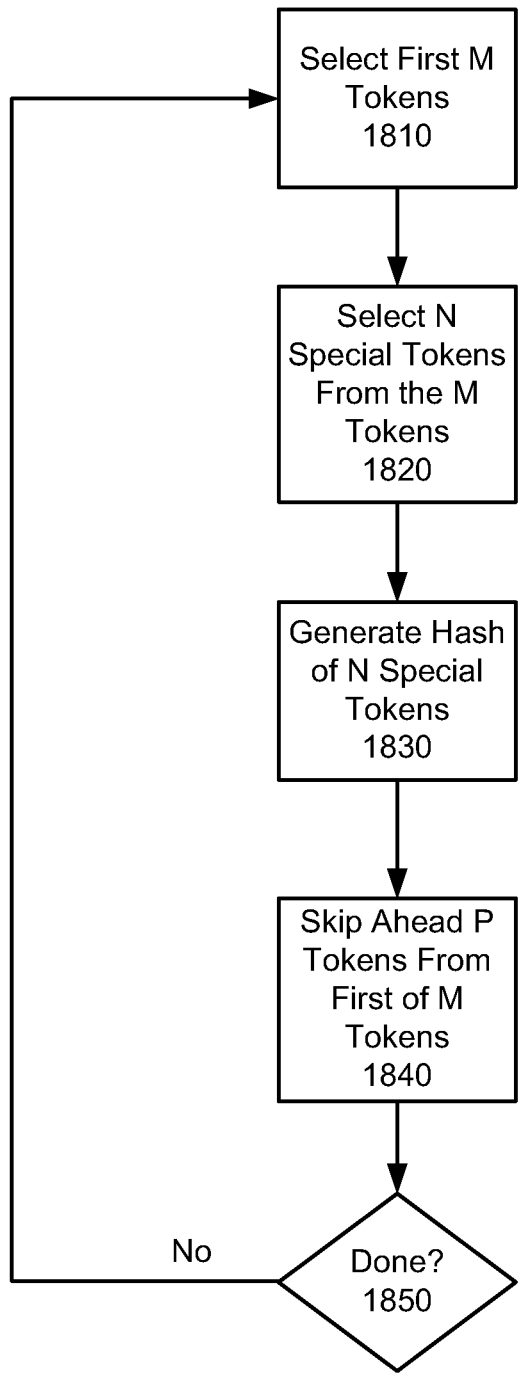
FIG. 18 is a flow diagram illustrating an embodiment of changing tokens into document signatures according to one embodiment of the present invention.

The document signatures are generated from the list of tokens at 1740. FIG. 18 illustrates an exemplary embodiment of a flow for changing tokens into document signatures. The first M tokens from a list of tokens generated from a document are selected at 1810, where M is an appropriate positive integer value. For example, if M is 10, then the first ten tokens from a list are selected.

Of the selected M tokens, N special tokens are selected at 1820, N also being an appropriate positive integer and is less than, or equal to, M. The N special tokens may be selected at random, in part based on size, and/or in part on obscurity. Tokens that occur less frequently are more obscure and thus more likely to be selected as a special token. A token dictionary may be provided to log the frequency of tokens.

The special tokens may also be selected based on the type of the token as defined by the normalization pattern matched by the source string. As set forth above, during the normalization process, some strings are identified as higher priority text (such as email addresses, credit card numbers, etc.) the tokenization of which results in higher priority tokens. Thus, the selection of the N special tokens may take the source string into account.

Tokens may also have an associated priority value that may be used in selecting the special tokens. The priority value can be based on the priority of the normalization pattern matched by the token (for example, social security number, credit card number, email address, etc.) or based on additional signs of uniqueness, such as the frequency of capitalized letters, and the inclusion of special rare characters (for example, "A", "*", "@", etc.)

A hash signature of the N special tokens is calculated, resulting in one of the document signatures at 1830. The hash is calculable in a number or ways. Special tokens may be hashed individually, or in groups, and the resultant hashes concatenated to form a signature, concatenated prior to the calculation, or hashed without concatenation at all. Any appropriate hash function and/or any combination of these hashing techniques may be utilized.

In one embodiment, before the next M tokens are selected, P tokens of the list of tokens are skipped from the first token of the M tokens at 1840. However, if P is zero, the next M tokens would be identical to the current M tokens, and therefore zero is not an allowed value for P. If P is less than M, then the next set of M tokens will overlap with the current set of M tokens. If P is equal to M, then the first token of the next M tokens will immediately follow the last token of the current M tokens. If P is greater than M, then some tokens are skipped between the next and the current M tokens.

A determination is made as to whether all signatures have been generated at 1850. This is be done by observing if there are less than M tokens remaining on the list, hence, the next M tokens cannot be selected. If all signatures for the document have been generated, then the process terminates. However, if more signatures are to be generated for the document the next M tokens are selected by reverting to selecting tokens at 1810.

There are numerous other ways to perform each of the proceedings of FIGS. 17 and 18. Some blocks are skipped entirely in some embodiments. For example, block 1730 in FIG. 17 may be skipped and the signatures generated directly from the normalized text. Regarding FIG. 18, various values may be used for M, N, and P, with each combination generating a different number of signatures. The specific configuration of M, N, and P thus depends on the needs of the enterprise and the volume and content of captured and registered documents. In an embodiment, M ranges between 8-20, N between 8-10, and P between 4-40.

Figure 19:
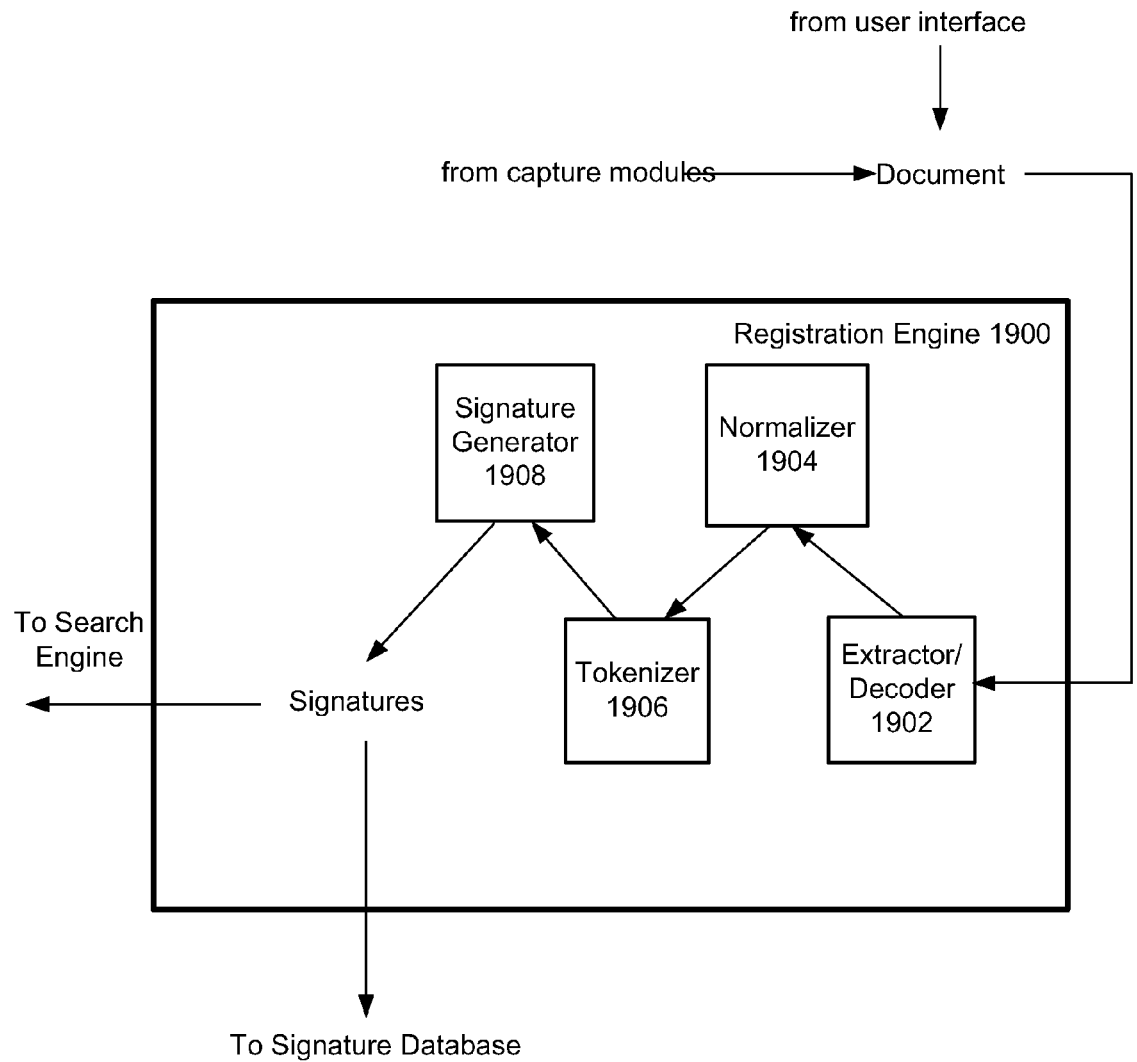
FIG. 19 illustrates an exemplary embodiment of a registration engine that generates signatures for documents.

FIG. 19 illustrates an embodiment of a registration engine 1900 that generates signatures for documents. The registration engine 1900 accepts documents, and generates signatures over these documents. The document may be one registered via the user interface, or one captured by the capture modules, as described above.

The registration engine 1900 includes an extractor/decoder 1902 to perform the functionality described with reference to block 1710 of FIG. 17. The registration engine also includes a normalizer 1904 to perform the functionality described with reference to block 1720 of FIG. 17. A tokenizer 1906 performs the functionality described with reference to 1730 of FIG. 17. A signature generator 1908 performs the functionality described with reference to block 1740 of FIG. 17. The signature generator 1908 may implement the process described with reference to FIG. 18.

Document De-Registration and Signature Database Maintenance

Documents can also be de-registered when their content is no longer considered worthy of registration. Various other signature database 1408 maintenance processes can be implemented. Referring to FIG. 15, the registration engine 1502 is also used to de-register documents. De-registration can be performed similarly to registration and interception, with the end result being the removal, as opposed to the addition of, the signatures generated.

The registration engine 1502 receives a document to be de-registered it generates a set of signatures associated with the document, and provides these signatures to the search engine 1510. The search engine 1510 identifies the signatures in the signature database 1408 that match any of the signatures associated with the document to be de-registered. Then, these matching signatures are removed from the signature database, resulting in the de-registration of the document. The next time the document is intercepted, none of its signatures will match any in the database.

In one embodiment, signatures stored in the signature database 1408 are accessible via the user interface 1412. Thus, a user can individually select and remove signatures from the database 1408. For example, if a user observes that a signature is generating too many false-positives (noticing irrelevant registered content), then the user can remove that signature from the database 1408.

Distributed Signature Matching

Figure 20:
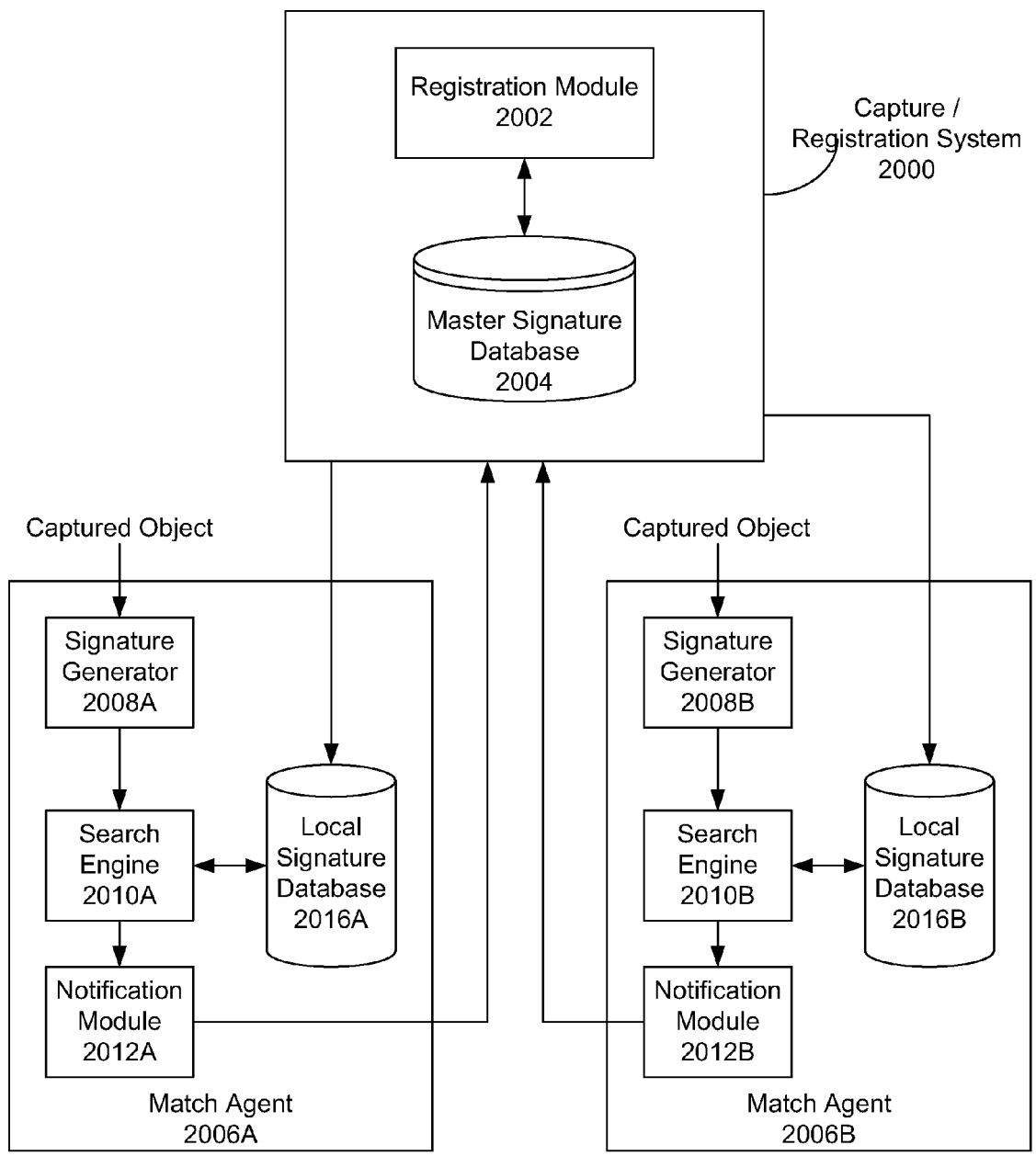
FIG. 20 illustrates an exemplary embodiment of a system for the detection of registered content performed on a distributed basis.

FIG. 20 illustrates an exemplary embodiment of a system for the detection of registered content performed on a distributed basis. The capture/registration system 2000 includes a registration module 2002 and a master signature database 2004. These components are similar or even identical to the capture/registration system 1400 described earlier, registration module 1410, and signature database 1408 as described with reference to FIGS. 14 and 15. Document registration is carried out by the capture/registration system 2000 as described above for other embodiments of the capture/registration system.

Detection of registered content, however, is performed in a distributed manner by match agents 2006A,B in an embodiment. The capture/registration system 1400 is also referred to as "manager agent". A match agent 3006A,B is implemented on a capture device 300, such as described earlier, that captures objects being transmitted on a network. A match agent 2006A,B may include object capture modules and network interface modules (not shown) to aid in capturing objects. Generally, a match agent 2006A,B does not register documents (this is done centrally by the capture/registration system 2000), but matches registered signatures against objects captured over a portion of a network monitored by the device that includes the match agent 2006A,B. For example, a network may have two or more capture devices each with its own match agent. In this manner, signature matching is distributed while document registration is centralized.

For simplicity, only two match agents 2006A,B are shown. Of course, more match agents may be utilized. Match agents are assignable to network segments, office sites, or any other logical organization. Each match agent 2006A,B includes a signature generator 2008A,B; search engine 2010A,B; and a local signature database 2016A,B. In one embodiment, the local signature database 2016A,B is implemented within configuration database 316/1416.

A signature generator 2008A,B generates the one or more signatures of an captured object, similar to the function of the registration engine 1502 described above with reference to FIG. 15.

A search engine 2010A,B (similar or identical to search engine 1510 in FIG. 15) compares the signature(s) of the captured object from the signature generator 2010A,B with signatures stored in local signature database 2016A,B. If a match is found and therefore registered content is detected, the search engine 2010A,B informs the notification module 2012A,B, which may communicate the presence of registered content to the capture/registration system 2000. The notification module 2012A,B may also record the match in a log file or database (not shown).

Local Signature Database Updates

One challenge that arises in such a distributed signature matching architecture, is keeping the local signature databases 2016A,B up-to-date and synchronized with the master signature database 2004. For example, when a user registers a document with the capture/registration system 2000, new signatures for that document should be distributed to the local signature databases 2016A,B. Similarly, if a signature is deleted or a document is de-registered from the master signature database 2004, local signature database 2016A,B updates should be performed.

The master database contains records including a signature and document identifier for register documents as described in detail earlier. The document identifier can be any identifier uniquely associated with an object or a pointer to stored object and identifies the registered document associated with the signature. Since a single registered document may have multiple signatures and various documents may result in the same signature, neither the signature nor the document identifier need to be unique for each record in the signature databases. However, the combination of a signature and a document identifier is unique as there is no need to store the same signature for the same document twice. Thus, the combination of signature and document identifier is the primary key of the master signature database 2004 and is searchable using this primary key.

A portion of an exemplary master signature database 2004 is now provided as Table 3:

TABLE 3

| Signatures | Document ID |
|---|---|
| Signature A | Document X |
| Signature B | Document X |
| Signature C | Document X |
| Signature D | Document Y |
| Signature A | Document Y |
| Signature E | Document Y |
| Signature C | Document Z |
| Signature F | Document Z |

The master signature database 2004 may also have other fields associated with each record in the table (signature, document combination) such as the relative or absolute position of the signature within the document, the relative uniqueness of the signature (as compared to other signatures in that document or among all documents), etc. In the example of Table 3, Signature A appears in multiple documents (Document X and Document Y), and Document X has multiple signatures (Signatures A, B, and C), the combination (concatenation) of Signature and Document ID is unique and can be used as the primary key of the master signature database 2004. For example, the combination "Signature A:Document X" is unique to the table.

The local signature databases 2016A,B utilize the same or similar structure as master signature database 2004. However, in an embodiment, to speed matching operations of the search engines 2010A,B, each signature is only stored once in the local signature databases 2016A,B. An example of a local signature database is of this type is depicted in Table 4:

TABLE 4

| Signatures | Document ID |
|---|---|
| Signature A | Document X |
| Signature B | Document X |
| Signature C | Document X |
| Signature D | Document Y |
| Signature E | Document Y |
| Signature F | Document Z |

Each signature is unique (none are repeated). Accordingly, for a local signature database 2016A,B, the signature alone is used as the primary key. Thus, the search engine 2010A,B of a match agent 2006A,B may use the signatures of the captured object directly to search for matches.

If a signature could be associated with more than one document, it does not matter which of the documents that a signature is associated with. In other words, Signature C could be associated by either Document X or Document Z in Table 4.

When the search engine 2010A,B matches a signature in the local signature database 2016A,B to a captured object, the notification module 2012A,B provides the document identifier associated with the signature in the local signature database 2016A,B to the capture/registration system 2000. The capture/registration system 2000 is then able to identify all other registered documents that include the signature matched by the match agent 2006A,B. For example, if the master signature database 2004 is as shown in Table 3 and the match agent 2006A,B has the local signature database 2016A,B as shown in Table 4, and Signature A is matched to a captured object by the match agent 2006A,B, Signature A and/or the associated Object X is provided to the capture/registration system 2000. The capture/registration system 2000 may look up Signature A in the master signature database 2000 as shown in Table 3 to find that Signature A is also found in Document Y.

The master signature database 2004 may change due to a new document being registered, a document becoming de-registered, a single signature being deleted without de-registering of any documents, etc. Such changes require an update to at least some of the local signature databases 2016A,B. This update may be performed in real-time as the change is made in the master signature database 2004, periodically, or on command.

Updates may occur via update patches (small changes) or re-writing the entire contents of a database. An update patch inserted into a local signature database contains a list of signatures and associated document identifiers. Generally, each signature found in the local signature database is overwritten (if they are found) with the new document identifier. If not found, the record of the signature and the object identifier is added. Records are removable by overwriting the associated document identifier with a pre-determined value, such as zero, or other common deletion techniques.

Update patches are temporally relevant. In other words, the series of update patches produced by the capture/registration system 2000 are inserted in a specific order by a match agent 2006A,B. In this manner, the update patches are queued individually for each separate match agent 2006A,B. Thus, if one match agent 2006A,B goes offline, the other online match agents 2006A,B are still be updated. When the match agent 2006A,B returns online, it installs the update patches it missed in sequence. Of course, the capture/registration system 2000 may generate a master patch to update the repaired match agent with a single update patch.

In an embodiment, the master patch required to update a match agent 2006A,B is generated by temporarily halting the insertion of new document signatures and generating a complete listing of all unique signatures in the signature database. In this manner, signature insertion is allowed to resume as soon as this patch has been queued for transport to match agent 2006A,B even if such transport has not been completed. Subsequent update patches are temporally relevant with respect to this master patch and are queued for subsequent application.

Configuration Manager

Large enterprise networks often include multiple divisions of network resources—e.g., among divisions of labor (engineering, sales, manufacturing, etc.), geographical locations, as well as other logical divisions and subdivisions of network resources. Deploying multiple capture systems 300 and/or capture/registration systems 1400 (hereinafter collectively "capture systems") throughout the network allows for a greater rate of processing packets and the ability to finely tune individual systems to meet the needs of specific divisions of the network. Utilizing a configuration manager reduces the overall operational expenditure associated with managing and maintaining an information security infrastructure by centrally managing policies and rules, providing incident and case management workflows, managing searches against one or multiple capture system object store modules and databases, and generally providing a centralized means of configuring and monitoring multiple capture systems.

Figure 21:
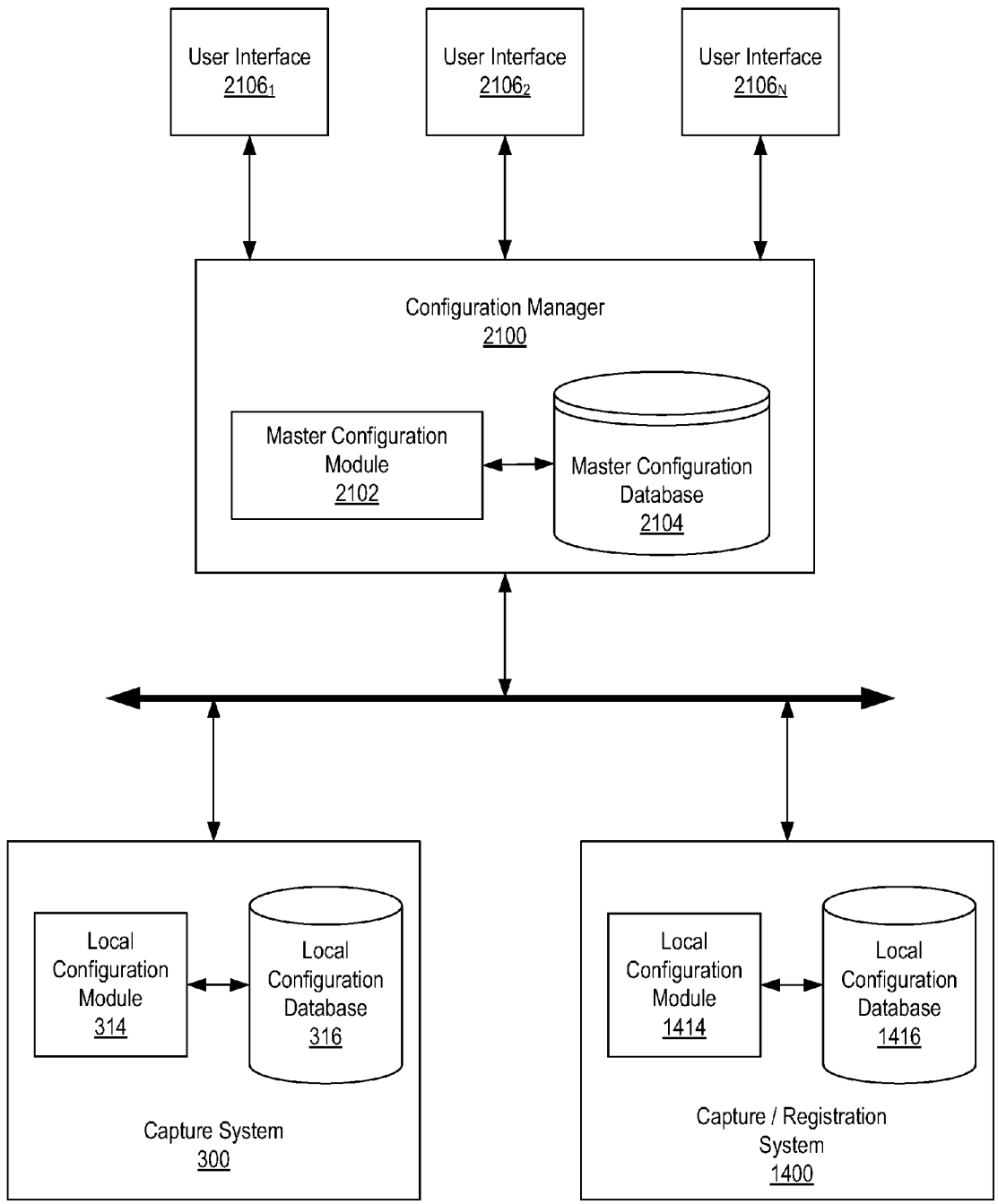
FIG. 21 illustrates an exemplary embodiment of a configuration management system in a network of multiple capture systems.

FIG. 21 illustrates an exemplary embodiment of a configuration management system in a network of multiple capture systems. The configuration manager 2100 includes a master configuration module 2102 and a master configuration database 2104. These components are similar to the capture system 300 and capture/registration system 1400 described earlier with reference to FIGS. 3 and 14, in particular configuration module 314/1414 and configuration database 316/1416. In one embodiment, configuration manager 2100 contains all of the components of a capture system.

Configuration manager 2100 is coupled with a plurality of capture systems over a network. Although only two capture systems are shown in FIG. 21, more capture systems can be coupled with configuration manager 2100. The capture systems can be a combination of one or more of capture system 300 and capture/registration system 1400.

The master configuration module 2102 enables the creation, management, and distribution of rules, policies, templates, filters, and crawler tasks (hereinafter "configurations") which are stored in master configuration database 2104 and distributed to the capture systems. The master configuration module 2102 is used to create and store configurations as described herein in regard to the capture systems (e.g., rule creation and document registration).

A policy is a collection of rules that apply to one or more capture systems. For example, an overarching data protection goal for one or more divisions of a network may require the creation of several rules. The creation of a policy containing this set of rules allows for a single assignment of the set of rules to the one or more capture systems associated with the respective network division(s). The triggering of any rule is treated as a violation of the policy.

Policies have a state attribute, which can be either be active or passive. Typically an active state enables the rules under the policy and a passive state de-activates all the contained rules under the policy. However, in one embodiment, each rule has an attribute to control the inheritance of the policy state. If a rule is in the inherit mode, any policy activation/deactivation results in the rule following the policy state attribute. If the inherit mode is disabled, the rule can be independently managed by the system or user and does not follow the policy state attribute.

The configuration manager 2100 also manages rule and action templates (described above in reference to capture system 300). Any change made to a template is distributed to all capture devices designated by the rule, effectively modifying the rule definition(s) that were built upon the template, in one or more capture devices, with a single change.

Similarly, content filters and network filters are associated with groups called filter groups. Filter groups are associated with capture devices. The configuration manager 2100 distributes all the filters in a group to the associated capture devices allowing capture devices in the same egress point to be armed with same filter settings.

Configuration manager 2100 further manages and distributes crawler tasks. Crawlers search for rule and policy violations within documents at-rest on the network (rather than relying solely upon intercepting packets during transmission) as well as creating an inventory of documents available for registration. Configuration manager 2100 determines which rules are applied by the crawlers, specific characteristics of documents that could trigger a recommendation of registration when discovered by crawlers, which divisions of the network apply individual crawler settings and tasks, and when crawlers are deployed (e.g., periodically, upon user command, in reaction to an event, etc.).

Configuration manager 2100 distributes the rules, policies, templates, filters, and crawler tasks to the attached capture systems. In one embodiment, configurations are distributed in Extensible Markup Language (XML) and addressed to devices as indicated by the configurations. Configurations are addressed by type of capture system or by network division (e.g., geographic location, company department, etc.). Configurations may be distributed in real-time when created, edited, or deleted in the master configuration module 2102 and master configuration database 2104, periodically, or on command. Configurations are queued individually for each separate capture system 300/1400. Thus, if one capture system goes offline, the other online capture systems are still be updated. When the offline capture system returns online, it automatically receives the configurations it missed in sequence. Alternatively, the configuration manager 2100 generates a master patch to update the returning capture system with a single configuration patch. Likewise, if a new capture system is added to the network, it can be immediately initialized with the most-recent default configurations.

The configuration manager 2100 maintains version attributes to support versioning of all the managed capture devices and corresponding configurations. For example, a rule in configuration database 2104 is modified and stored within configuration database 2104 as a second version (without deleting the first version). Capture systems may then be configured with the first or second version of this rule. The configuration manager 2100 automatically distributes default configurations to any new device added to the network. In an embodiment, the default configurations reflect the most recent versions of configurations, the original version of configurations, or otherwise as selected by a user. Disparate policies can be leveraged across a plurality of capture systems, thereby providing compliance with, e.g., regional and international regulations.

User interface $2106_{1-N}$ allows user access to configuration manager 2100 to create, edit, delete, and otherwise manage configurations for capture systems. In one embodiment, user interface 2106$_{1-N}$ is implemented via a web or network-based graphical user interface (GUI) (e.g., written in Java or other programming language). In another embodiment, user interface 2106$_{1-N}$ is implemented via a console coupled with configuration manager 2100. Configuration manager 2100, via user interface 2106$_{1-N}$, allows simultaneous user access to master configuration module 2102, master configuration database 2104, attached capture systems, etc. by multiple users. In one embodiment, transactional isolation of multiple accesses to the above resources through the user interface 2106$_{1-N}$ is implemented on a first come, first serve basis— e.g., the first user to access a configuration has full access and any additional users that attempt to access the configuration during that time may access the configuration on a read-only basis or create an additional version of the configuration.

In one embodiment, role-based access controls (RBAC) limit users to the configurations of a subset of capture systems. For example, an administrator has access to manage the entire network of capture systems while a user responsible only for the legal department is granted access to those capture systems deployed in/affecting the legal department's division of the network. By providing a centralized management system that is fully integrated with RBAC, multiple teams (across network divisions) can seamlessly collaborate on violations. RBAC capabilities allow an administrator to define who is able to access the system and in what capacity to allow disparate teams to collaborate on device management, incident remediation, or simply for viewing reports or status. Users are provided with both macro-level risk reporting and statistics as well as micro-level incident information and actions, mapping directly to organizational responsibilities. Permissions are assigned to a role in a granular manner, providing the administrator with a means of explicitly controlling which user types have access to which pieces of the capture systems. Furthermore, incident views can be narrowed to user roles to ensure that, for example, a compliance user doesn't see intellectual property incidents, or that a content owner doesn't see incidents related to privacy data.

The configuration manager 2100 provides a single aggregation of reports for all incidents identified throughout the network. Using the search engine (described herein) against the capture databases, users can identify sensitive information, tune configurations or create new configurations. The accuracy of the new configurations can be validated prior to activating them by running them against historical information stored in the capture devices. Results of applying new configurations against historical information stored in the capture devices gives an opportunity to identify false-positives, errors, and desirable exceptions.

The configuration manager 2100 is also able to provide executive and summary reports for each individual responsible for a division of the network. The centralized incident aggregation permits users to work with incidents and escalate severe events through an established role-based hierarchy. This allows full role delegation between key stakeholders to properly remediate incidents and correct network behaviors.

Closing Comments

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable medium suitable for storing electronic instructions.

In one embodiment, a capture system is an appliance constructed using commonly available computing equipment and storage systems capable of supporting the software requirements.

Figure 22:
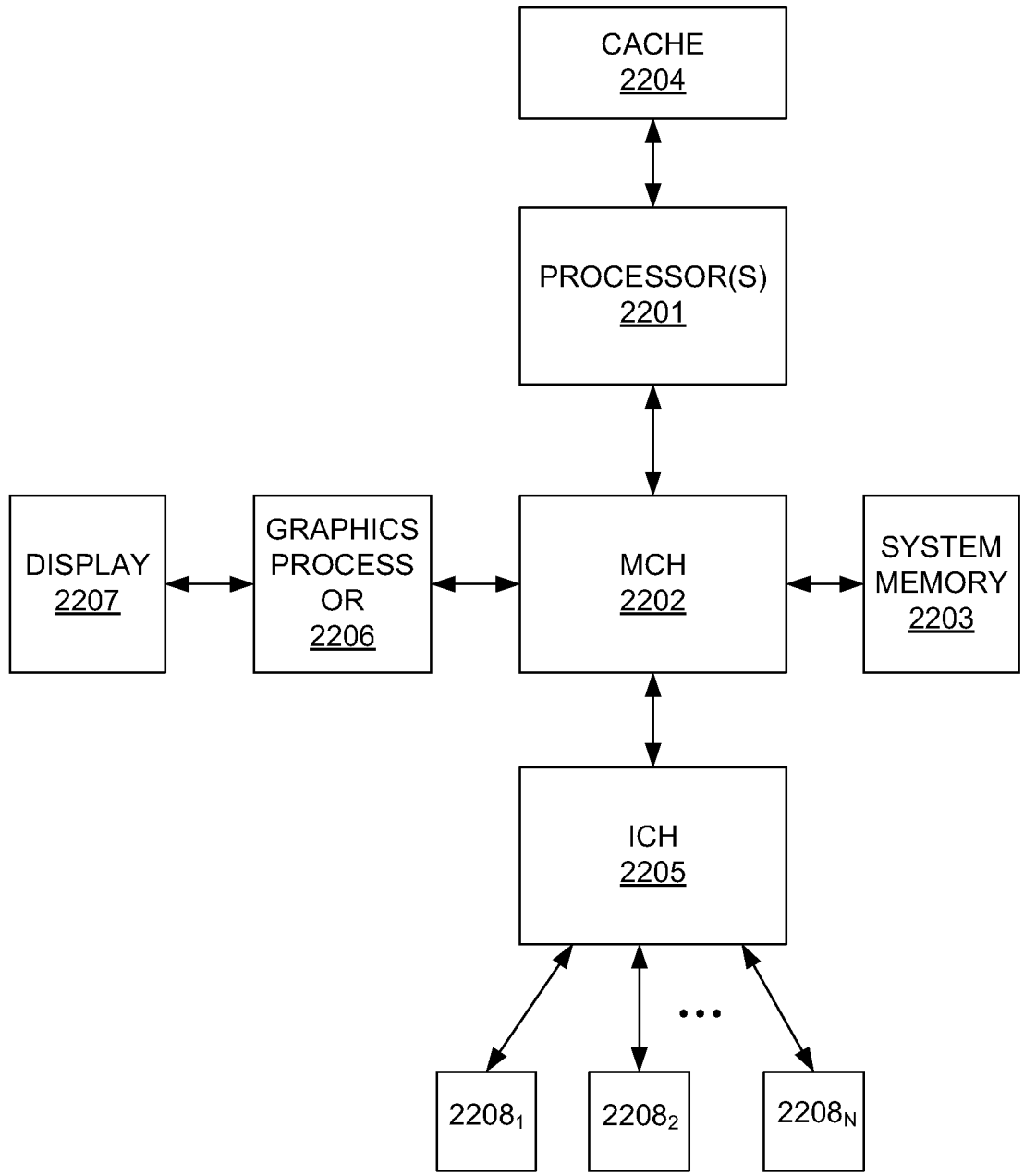
FIG. 22 shows an exemplary embodiment of a computing system (e.g., a computer).

FIG. 22 shows an embodiment of a computing system (e.g., a computer). The exemplary computing system of FIG. 22 includes: 1) one or more processors 2201; 2) a memory control hub (MCH) 2202; 3) a system memory 2203 (of which different types exist such as DDR RAM, EDO RAM, etc,); 4) a cache 2204; 5) an I/O control hub (ICH) 2205; 6) a graphics processor 2206; 7) a display/screen 2207 (of which different types exist such as Cathode Ray Tube (CRT), Thin Film Transistor (TFT), Liquid Crystal Display (LCD), Digital Light Processing (DLP), Organic LED (OLED), etc.; and 8) one or more I/O and storage devices 2208.

The one or more processors 2201 execute instructions in order to perform whatever software routines the computing system implements. The instructions frequently involve some sort of operation performed upon data. Both data and instructions are stored in system memory 2203 and cache 2204. Cache 2204 is typically designed to have shorter latency times than system memory 2203. For example, cache 2204 might be integrated onto the same silicon chip(s) as the processor(s) and/or constructed with faster SRAM cells whilst system memory 2203 might be constructed with slower DRAM cells. By tending to store more frequently used instructions and data in the cache 2204 as opposed to the system memory 2203, the overall performance efficiency of the computing system improves.

System memory 2203 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 2203 prior to their being operated upon by the one or more processor(s) 2201 in the implementation of a software program. Similarly, data that a software program determines should be sent from the computing system to an outside entity through one of the computing system interfaces, or stored into an internal storage element, is often temporarily queued in system memory 2203 prior to its being transmitted or stored.

The ICH 2205 is responsible for ensuring that such data is properly passed between the system memory 2203 and its appropriate corresponding computing system interface (and internal storage device if the computing system is so designed). The MCH 2202 is responsible for managing the various contending requests for system memory 2203 access amongst the processor(s) 2201, interfaces and internal storage elements that may proximately arise in time with respect to one another.

One or more I/O devices 2208 are also implemented in a typical computing system. I/O devices generally are responsible for transferring data to and/or from the computing system (e.g., a networking adapter); or, for large scale nonvolatile storage within the computing system (e.g., hard disk drive). ICH 2205 has bi-directional point-to-point links between itself and the observed I/O devices 2208. A capture program, classification program, a database, a filestore, an analysis engine and/or a graphical user interface may be stored in a storage device or devices 2208 or in memory 2203.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Thus, a capture system and a document/content registration system have been described. In the forgoing description, various specific values were given names, such as "objects," and various specific modules, such as the "registration module" and "signature database" have been described. However, these names are merely to describe and illustrate various aspects of the present invention, and in no way limit the scope of the present invention. Furthermore, various modules may be implemented as software or hardware modules, combined, or without dividing their functionalities into modules at all. The present invention is not limited to any modular architecture either in software or in hardware, whether described above or not.

What is claimed is:

1. A non-transitory computer-implemented method comprising:
    distributing a rule to a distributed capture system, wherein the rule defines an action for the distributed capture system to perform regarding packets intercepted by the distributed capture system;
    storing the rule in a global configuration database, which includes registered documents, each of the registered documents including a respective signature and a respective document identifier that collectively form a primary key, which can be searched within the global configuration database; and
    distributing a plurality of crawler tasks to the capture system, wherein the crawler tasks are configured to search for rule violations within resting documents that are not being transmitted over a network connection, wherein the action is based on a particular document registered with the capture system and content of an object provided in the packets, and wherein the particular document is identified by one or more signatures, which can be compared against signatures derived from the object.

2. The method of claim 1, wherein the rule is distributed within a policy, and wherein the policy includes one or more rules and a designation as to which of a plurality of distributed capture systems should apply the policy.

3. The method of claim 2, wherein the policy further includes a policy state of either active or passive and each of the one or more rules within the policy are individually set to inherit or not to inherit the policy state.

4. The method of claim 1, wherein the action is based upon one or more of the following:
    the source or destination of the packets.

5. The method of claim 1, wherein the rule defines an action of the distributed capture system regarding files stored on a network or a portion of a network associated with the distributed capture system.

6. The method of claim 5, wherein the rule defines what objects stored on a network or a portion of a network associated with the distributed capture system should be registered by the capture system.

7. The method of claim 1, wherein the rule is based upon a user-defined template.

8. The method of claim 1, wherein the defined action is one or more of the following: an email notification, a syslog notification, and prevention of the transmittal of the intercepted packets.

9. The method of claim 1, wherein the rule further defines exceptions to the defined action.

10. The method of claim 1, further comprising:
    storing, in the global configuration database, a plurality of versions of the rule and which version of the rule applies to the distributed capture system.

11. The method of claim 10, further comprising:
    identifying an additional distributed capture system in a network;
    distributing a default version of a rule to the additional distributed capture system, wherein the rule defines an action for the additional distributed capture system to perform regarding packets intercepted by the additional distributed computer system.

12. The method of claim 1, wherein the rule is distributed in response to one or more of the following: the addition of a capture system to a network, a capture system reestablishing a connection to a network, a periodic update, the creation of a new rule, a change made to an existing rule, and the deletion of a rule.

13. A non-transitory machine-readable storage medium having executable instructions that when executed, cause a machine to perform operations comprising:
    distributing a rule to a distributed capture system, wherein the rule defines an action for the distributed capture system to perform regarding packets intercepted by the distributed capture system;
    storing the rule in a global configuration database, which includes registered documents, each of the registered documents including a respective signature and a respective document identifier that collectively form a primary key, which can be searched within the global configuration database; and
    distributing a plurality of crawler tasks to the capture system, wherein the crawler tasks are to search for rule violations within resting documents that are not being transmitted over a network connection, wherein the action is based on a particular document registered with the capture system and content of an object provided in the packets, and wherein the particular document is to be identified by one or more signatures, which can be compared against signatures derived from the object.

14. The machine-readable storage medium of claim 13, wherein the rule is distributed within a policy, and wherein the policy includes one or more rules and a designation as to which of a plurality of distributed capture systems should apply the policy.

15. The machine-readable storage medium of claim 14, wherein the policy further includes a policy state of either active or passive and each of the one or more rules within the policy are individually set to inherit or not to inherit the policy state.

16. The machine-readable storage medium of claim 13, wherein the defined action is based upon one or more of the following:
    the source or destination of the intercepted packets.

17. The machine-readable storage medium of claim 13, wherein the rule defines an action of the distributed capture system regarding files stored on a network or a portion of a network associated with the distributed capture system.

18. The machine-readable storage medium of claim 17, wherein the rule defines what objects stored on a network or a portion of a network associated with the distributed capture system should be registered by the capture system.

19. The machine-readable storage medium of claim 13, wherein the rule is based upon a user-defined template.

20. The machine-readable storage medium of claim 13, wherein the defined action is one or more of the following: an email notification, a syslog notification, and prevention of the transmittal of the intercepted packets.

21. The machine-readable storage medium of claim 13, wherein the rule further defines exceptions to the defined action.

22. The machine-readable storage medium of claim 13, wherein the executable instructions, when executed, further cause the machine to perform operations comprising:
storing, in the global configuration database, a plurality of versions of the rule and which version of the rule applies to the distributed capture system.

23. The machine-readable storage medium of claim 22, wherein the executable instructions, when executed, further cause the machine to perform operations comprising:
identifying an additional distributed capture system in a network;
distributing a default version of a rule to the additional distributed capture system, wherein the rule defines an action for the additional distributed capture system to perform regarding packets intercepted by the additional distributed capture system.

24. The machine-readable storage medium of claim 13, wherein the rule is distributed in response to one or more of the following:
the addition of a capture system to a network, a capture system reestablishing a connection to a network, a periodic update, the creation of a new rule, a change made to an existing rule, and the deletion of a rule.

25. A system comprising:
a memory including a global configuration database to store a rule;
a configuration manager coupled to the global configuration database to distribute the rule; and
a distributed capture system to receive the rule and store the rule in a local configuration database, wherein the rule defines an action for the distributed capture system to perform regarding packets intercepted by the distributed capture system, wherein the global configuration database is configured to store registered documents, each of the registered documents including a respective signature and a respective document identifier that collectively form a primary key, which can be searched within the global configuration database, wherein the configuration manager is configured to distribute a plurality of crawler tasks to the distributed capture system, wherein the crawler tasks are configured to search for rule violations within resting documents that are not being transmitted over a network connection, wherein the action is based on a particular document registered with the capture system and content of an object provided in the packets, and wherein the particular document is identified by one or more signatures, which can be compared against signatures derived from the object.

26. The system of claim 25, wherein the rule is distributed within a policy, and wherein the policy includes one or more rules and a designation as to which of a plurality of distributed capture systems should apply the policy.

27. The system of claim 26, wherein the policy further includes a policy state of either active or passive and each of the one or more rules within the policy are individually set to inherit or not to inherit the policy state.

28. The system of claim 25, wherein the global configuration database further stores a plurality of versions of the rule and which version of the rule applies to the distributed capture system.

29. The system of claim 25, wherein the configuration manager distributes the rule in response to one or more of the following: the addition of a capture system to a network, a capture system reestablishing a connection to a network, a periodic update, the creation of a new rule, a change made to an existing rule, and the deletion of a rule.

30. An apparatus comprising:
a memory including a global configuration database to store a rule; and
a configuration manager coupled to the global configuration database to distribute the rule to a distributed capture system, wherein the rule defines an action for the distributed capture system to perform regarding packets intercepted by the distributed capture system, wherein the global configuration database is configured to store registered documents, each of the registered documents including a respective signature and a respective document identifier that collectively form a primary key, which can be searched within the global configuration database, and wherein the configuration manager is configured to distribute a plurality of crawler tasks to the capture system, and wherein the crawler tasks are configured to search for rule violations within resting documents that are not being transmitted over a network connection, wherein the action is based on a particular document registered with the capture system and content of an object provided in the packets, and wherein the particular document is identified by one or more signatures, which can be compared against signatures derived from the object.

31. The apparatus of claim 30, wherein the rule is distributed within a policy, and wherein the policy includes one or more rules and a designation as to which of a plurality of distributed capture systems should apply the policy.

32. The apparatus of claim 31, wherein the policy further includes a policy state of either active or passive and each of the one or more rules within the policy are individually set to inherit or not to inherit the policy state.

33. The apparatus of claim 30, wherein the global configuration database further stores a plurality of versions of the rule and which version of the rule applies to the distributed capture system.

34. The apparatus of claim 30, wherein the configuration manager distributes the rule in response to one or more of the following: the addition of a capture system to a network, a capture system reestablishing a connection to a network, a periodic update, the creation of a new rule, a change made to an existing rule, and the deletion of a rule.

* * * * *